US008332730B2

(12) United States Patent
Harrison et al.

(10) Patent No.: US 8,332,730 B2
(45) Date of Patent: Dec. 11, 2012

(54) DATA PROCESSING ARRANGEMENTS FOR USE IN DATA COMMUNICATION APPARATUS IN CONNECTION WITH ERROR CORRECTION

(75) Inventors: Keith Harrison, Chepstow (GB); William Munro, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 350 days.

(21) Appl. No.: 12/740,341

(22) PCT Filed: Oct. 14, 2008

(86) PCT No.: PCT/GB2008/050939
§ 371 (c)(1),
(2), (4) Date: Apr. 28, 2010

(87) PCT Pub. No.: WO2009/056871
PCT Pub. Date: May 7, 2009

(65) Prior Publication Data
US 2010/0257434 A1    Oct. 7, 2010

(30) Foreign Application Priority Data
Oct. 31, 2007    (GB) .................................. 0721308.5

(51) Int. Cl.
*H03M 13/00* (2006.01)
(52) U.S. Cl. ........................................ 714/781; 714/785
(58) Field of Classification Search ................... 714/781, 714/785
See application file for complete search history.

(56) References Cited

U.S. PATENT DOCUMENTS

| 7,239,606 B2* | 7/2007 | Gilmour et al. | 370/222 |
|---|---|---|---|
| 2003/0031123 A1* | 2/2003 | Gilmour et al. | 370/216 |
| 2005/0210363 A1* | 9/2005 | Cadic et al. | 714/781 |
| 2009/0113267 A1* | 4/2009 | Harrison et al. | 714/746 |

FOREIGN PATENT DOCUMENTS

| EP | 1 603 268 A | 12/2005 |
|---|---|---|
| EP | 1 715 614 A | 10/2006 |

(Continued)

OTHER PUBLICATIONS

Mao, Yongyi et al., "On Factor Graphs and the Fourier Transform" IEEE Transactions on Information Theory, vol. 51, No. 5, pp. 1635-1649 (May 1, 2005).
Pishro-Nik, Hossein et al., "Nonuniform Error Correction Using Low-Desnsity Parity-Check Codes" IEEE Transactions on Information Theory, vol. 51, No. 7, pp. 2702-2714 (Jul. 1, 2005).

(Continued)

*Primary Examiner* — Yolanda L Wilson

(74) *Attorney, Agent, or Firm* — Robert Francis Squibbs

(57) ABSTRACT

A processing arrangement of a data communication apparatus is arranged to derive an ordered plurality of modulo-2 summations of respective selections of data bits of a binary data set. The data communication apparatus may either be transmitting apparatus with the processing arrangement serving to determine a target syndrome for subsequent use in error correction, or receiving apparatus with the data processing arrangement being arranged to effect error correction of received data. The processing arrangement effects its selections of bits from the binary data set in accordance with the interconnection of nodes in a logical network of nodes and edges that together define at least a continuum of cells covering a finite toroid. The structuring provided to bit selection by this continuum can be offset by randomness provided by other structures of the network and by the random association of bits of the binary data set with the nodes of the continuum.

12 Claims, 16 Drawing Sheets

FOREIGN PATENT DOCUMENTS

| | | |
|---|---|---|
| JP | 2004-274459 | 9/2004 |
| JP | 2006-254466 | 9/2006 |
| WO | WO2006/001668 A | 1/2006 |

OTHER PUBLICATIONS

Song, Hongwei et al., "Low Density Parity-Check Codes for partial Response Channels" IEEE Signal Processing Magazine, vol. 21, No. 1, pp. 56-66 (Jan. 1, 2004).

Sun, Lingyan et al., "Error Floor Investigation and Girth Optimization for Certain Types of Low-Density Parity Check Codes" 2005 IEEE International Conference on Acoustics, Speech, and Signal Processing, vol. 3, pp. 1101-1104 (Mar. 18, 2005).

Wiberg, Niclas, "Codes and Decoding on General Graphs" Linkoeping Studies in Science and Technology, Linkoeping University, Linkoeping, Sweden, pp. 1-94 (1996).

\* cited by examiner

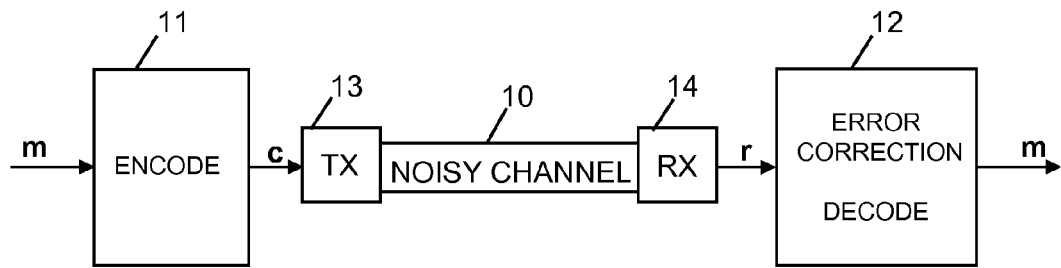
Figure 1
(PRIOR ART)
$$H_1 = \begin{bmatrix} 1 & 1 & 0 & 1 & 0 & 0 & 0 \\ 0 & 1 & 1 & 0 & 1 & 0 & 0 \\ 0 & 0 & 1 & 1 & 0 & 1 & 0 \\ 0 & 0 & 0 & 1 & 1 & 0 & 1 \\ 1 & 0 & 0 & 0 & 1 & 1 & 0 \\ 0 & 1 & 0 & 0 & 0 & 1 & 1 \\ 1 & 0 & 1 & 0 & 0 & 0 & 1 \end{bmatrix}$$
Each row represents a parity-check equation
Figure 2
(PRIOR ART)
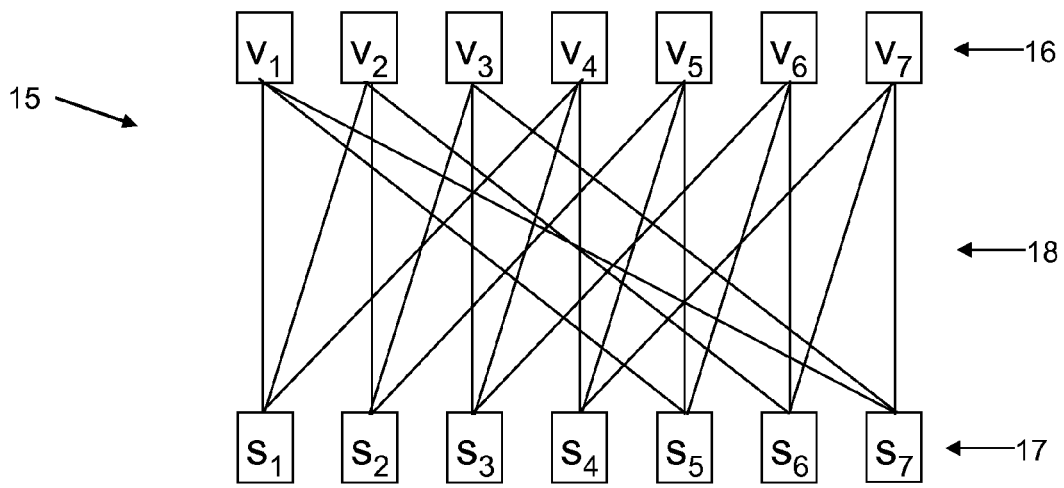
Figure 3
(PRIOR ART)

$H_2 =$

"2s - Linear Adjacent"

"2s - Linear Trio Ends"

DATA PROCESSING ARRANGEMENTS FOR USE IN DATA COMMUNICATION APPARATUS IN CONNECTION WITH ERROR CORRECTION

FIELD OF THE INVENTION

The present invention relates to data processing arrangements for use in data communication apparatus in connection with the error correction of data passed over a noisy channel and is of particular, but not exclusive, relevance to quantum key distribution (QKD) methods and apparatus.

BACKGROUND TO THE INVENTION

QKD methods and systems have been developed which enable two parties to share random data in a way that has a very high probability of detecting any eavesdroppers. This means that if no eavesdroppers are detected, the parties can have a high degree of confidence that the shared random data is secret. QKD methods and systems are described, for example, in U.S. Pat. No. 5,515,438, U.S. Pat. No. 5,999,285 and GB 2427317 A. In many known QKD systems, for example BB84 free-space systems, randomly polarized photons are sent from a transmitting apparatus to a receiving apparatus.

Whatever particular QKD system is used, QKD methods typically involve sending a random data set from a QKD transmitter to a QKD receiver over a quantum signal channel, the QKD transmitter and receiver then respectively processing the data transmitted and received via the quantum signal channel with the aid of messages exchanged between them over an insecure classical communication channel thereby to derive a common subset of the random data set. As the quantum signal channel is a noisy channel, the processing of the data received over that channel includes an error correction phase. However, error correction of the data passed over the quantum signal channel cannot be effected using standard techniques such as the encoding/decoding of the data using linear block codes because only a small percentage of the transmitted photons are ever received. Instead, error correction of the quantum-signal-channel data relies on messages exchanged over the classical channel which is either error free or effectively made so by the use of standard error correction techniques. The classical communication channel need not be secure, as randomization techniques can be used to minimize the information given away. It will be appreciated that even if the classical channel were secure, it does not possess the property of detecting eavesdroppers and therefore cannot substitute for the quantum signal channel.

The present invention relates to error correction and can be used, inter alia, in relation to correcting random data passed over a quantum signal channel.

The use of linear block codes in effecting error correction of data passed over classical communication channels is well known. Briefly, and as depicted in FIG. 1 of the accompanying drawings, a message to be sent over a noisy channel is divided into data blocks m each of k symbols—these symbols are typically binary bits and this will be assumed hereinafter unless otherwise stated. Conveniently each message block can be represented as a row vector m of k bits. Each message block is encoded in encoder 11 into a corresponding n-bit codeword (represented by row vector c) where n>k. The codeword c used is selected from a predetermined set of codewords (the 'code' C). For a message block of k bits and a codeword of n bits, the corresponding code C is termed a (n, k) code. After the message block m is encoded as a corresponding codeword c, that codeword is sent by transmitter 13 over the noisy channel 10 and is received at the far end by receiver 14, the output of the receiver being an n-bit received word (represented by row vector r). If no errors are introduced by the transmission over channel 10, the received word r will, of course, correspond to the transmitted codeword c and it is straightforward for decoder 12 to convert the received word r back into the original message block m. Generally, however, the received word r will not correspond to the transmitted codeword c; nevertheless, provided the decoder 12 knows the code C being used by the encoder 11 and the number of errors is limited, it is possible for the decoder 12 to recover the message block m.

Linear block codes are defined by generator and parity-check matrices. In particular, a linear block code C is defined by the null space of its corresponding parity-check matrix H and the product of each codeword c of the code C and the transpose of the parity-check matrix H is the zero vector:

$$c \cdot H^T = 0$$

FIG. 2 of the accompanying drawings depicts an example parity check matrix $H_1$ of a (7, 3) linear block code. The code corresponding to the FIG. 2 parity check matrix $H_1$ is of a type referred to as a regular "low density parity check" or "LDPC" code, the name reflecting the fact that the parity check matrix is a sparse matrix and the epithet 'regular' indicating that all the rows have the same weight and all the columns also have the same weight. LDPC codes are particularly suitable for use with large message blocks.

The product of the received word r and the transpose of the parity-check matrix is called the error syndrome of r, here represented by vector s:

$$s = r \cdot H^T$$

Of course, if the error syndrome s is zero, then the received word r is a codeword c.

Effectively, each row of the parity-check matrix H defines a constraint that must be satisfied by a received word r for it to be judged a valid codeword c. More particularly, each row indicates the bit positions of a received word r whose values must sum to zero, modulo 2 (for binary symbols). Looked at another way, the result of the modulo-2 summation indicated by each row of the parity-check matrix produces a corresponding bit of the error syndrome.

The set of constraints defined by the rows of the parity-check matrix H can be graphically represented by a bipartite graph, known as a Tanner graph, comprising:

a first group of nodes (herein called 'variable' nodes and indicated by the letter 'v') each corresponding to a respective bit position of an input variable (in the present context the received word r), a second group of nodes (herein called 'sum' nodes and indicated by the non-bold letter s) each corresponding to a respective modulo-2 summation and thus to a respective row of the parity-check matrix, and edges connecting each sum node s to a respective selection of the variable nodes v, each selection being in accordance with the corresponding row of the parity check matrix.

The values produced at sum nodes s on summing, modulo-2, the values of the connected bit positions of the input variable (received word r) give the error syndrome s. FIG. 3 of the accompanying drawings shows the Tanner graph 15 of the FIG. 2 parity check matrix $H_1$, the graph comprising seven variable nodes 16 (labelled $v_1$ to $v_7$), seven sum nodes 17 (labelled $s_1$ to $s_7$), and edges 18.

It will be appreciated that any given Tanner Graph is characterised by the interconnection of its variable and sum nodes in the network of nodes and edges established by the graph rather than by any particular visual layout of the network; for example, arranging the variable nodes $v_1$ to $v_7$ of the Tanner graph 15 in a different order to that illustrated in FIG. 3, without changing their association to the bit positions of the input variable or the interconnection of each specific variable node to sum nodes, does not change the Tanner graph, merely its visual representation. The representation need not, of course, be visual and, in particular can be a logical representation in a computing environment (for example, lists of nodes indicating their types and linkages to other nodes) and this is to be understood in the following description of the invention wherever a processing system is described as creating or working with a graph.

While the presence of one or more errors in the received word r can be easily determined by checking whether the error syndrome s is non-zero, error correction is more complicated. One error correction method (suitable for use, for example, with LDPC codes) is iterative probabilistic decoding also known as iterative belief propagation or the "Sum-Product" algorithm. A description of this method can be found in various textbooks, for example: "Information Theory, Inference and Learning Algorithms" David J. Mackay, Cambridge University Press, 2003 ISBN 0 521 64298 1, page 559 et segue, herein incorporated by reference—this book is also available on line at: www.inference.phy.cam.ac.uk/mackay/itila/book.html The Sum-Product algorithm is based on a network nodes and edges corresponding to the above-described graphical representation of the constraints defined by the parity-check matrix. More particularly, the Sum-Product algorithm involves each variable node v being initially assigned a probability corresponding to the probability that the corresponding bit of the input variable (received word r) has a particular value (for example, zero). This probability will depend on the error rate of the channel over which the word r was received; for example, if the channel error rate was 0.05, then the probability of a '0' in the received word r actually being '0' is 0.95 whereas the probability of a '1' in the received word r actually being '0' is 0.05.

Each sum node s is assigned an output value corresponding to the value that the sum node will produce when a codeword is presented to the variable nodes; for the above-described context this value is, of course, zero. The ordered set of these values across all the sum nodes is herein termed the "target syndrome" s as it corresponds to the desired value of the error syndrome, that is, the zero vector for the above-described context.

Thereafter, probabilities are exchanged along the edges between the nodes in a series of cycles each of which serves to adjust the probabilities assigned to the variable nodes until convergence is achieved corresponding to variable-node inputs taking on values satisfying the constraints (that is, values that are consistent with the outputs of the sum nodes matching the target syndrome). Each cycle comprises two phases:

In phase 1: messages are sent from each of the variable nodes to the connected sum nodes whereby each sum node is informed of the probability currently assigned to each of its connected variable nodes. Each sum node then determines, for each connected variable node, and on the basis of the assigned output value of the sum node and the probabilities received from the other connected variable nodes, the probability of the concerned variable node having the aforesaid particular value.

In phase 2: messages are sent from each of the sum nodes to the connected variable nodes whereby each variable node is informed of the probabilities currently determined for it by each of its connected sum nodes. Each variable node then assigns itself a new probability based on the probabilities it has received from its connected sum nodes.

Eventually, the probability at each variable node should converge and stabilize as a probable '1' or '0' indicating the corresponding input value satisfying the constraints set by the graph.

Although the Sum-Product algorithm is described above in terms of probabilities, these probabilities can be represented in a variety of ways besides as straight probabilities; for example it would equally be possible to use log probabilities, or likelihoods/log likelihoods. Reference herein to the probabilities manipulated by the Sum-Product algorithm are to be understood as encompassing such alternative representations.

As noted above, the 'target syndrome' will in the context of retrieving the codeword c corresponding to a received word r have a value of zero. However, this need not always be the case. For example, the target syndrome may in fact be the error syndrome itself where the Sum-Product algorithm is used to derive values for the noise vector (see FIG. 47.2c and pages 558, 559 of the above-referenced textbook)

SUMMARY OF THE INVENTION

According to one aspect of the present invention, there is provided data communication apparatus comprising a processing arrangement arranged to derive an ordered plurality of modulo-2 summations of respective selections of data bits of a binary data set, said selections being in accordance with the connection of sum nodes to variable nodes in a logical network of nodes and edges that together define at least a continuum of cells covering a finite toroid, each cell being delimited by an equal number of variable and sum nodes alternately arranged and interconnected into a loop by edges, each variable node being associated with a respective binary data set bit position and each sum node corresponding to a respective said modulo-2 summation.

According to another aspect of the present invention, there is provided an error-correction arrangement arranged to apply iterative belief propagation to adjust bit-value probabilities of a received binary data set such that an ordered plurality of modulo-2 summations of probable values of respective selections of received-data-set bits matches a target syndrome, said selections being in accordance with the connection of sum nodes to variable nodes in a network of nodes and edges that together define at least a continuum of cells covering a finite toroid, each cell being delimited by an equal number of variable and sum nodes alternately arranged and interconnected into a loop by edges, each variable node being associated with a respective received-data-set bit position and each sum node corresponding to a respective said modulo-2 summation.

BRIEF DESCRIPTION OF THE DRAWINGS

The present invention will now be described, by way of example only, with reference to the accompanying diagrammatic drawings of example embodiments, in which:

FIG. 1 is a diagram illustrating the encoding of a message for sending over a noisy channel according to a prior-art method;

FIG. 2 shows an example parity-check matrix of known form;

FIG. 3 is a Tanner graph corresponding to the FIG. 2 parity-check matrix;

DESCRIPTION OF THE PREFERRED EMBODIMENTS

Embodiments of the present invention are initially described below with reference to a generalized context depicted in FIG. 4; application to the specific context of quantum key distribution is described later with reference to FIGS. 26 and 27.

Figure 4:
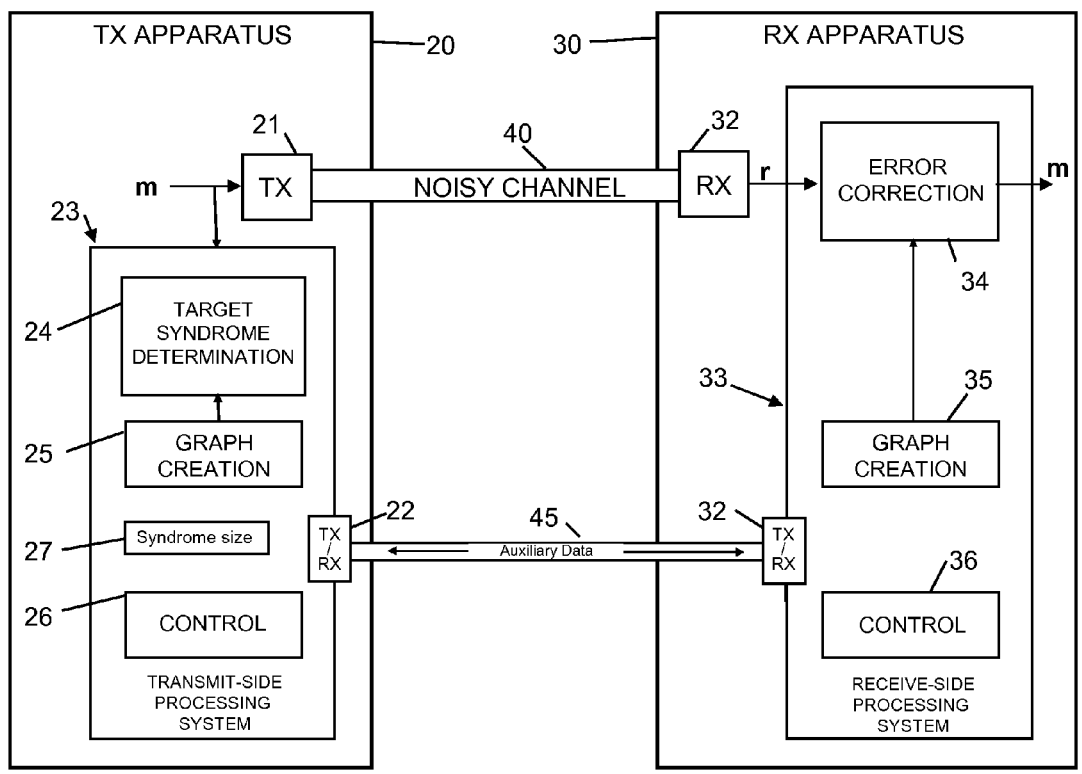
FIG. 4 is a diagram depicting the general form of a system embodying the present invention.

FIG. 4 depicts a system in which subject data (a binary data set herein represented by row vector m) is sent by a first transmitter 21 of transmitting apparatus 20 over a noisy first channel 40 to a first receiver 32 of receiving apparatus 30, the output of the first receiver 32 being errored received data (a binary data set herein represented by row vector r). Use of the row vectors m and r to represent the subject data and received data is for convenience and is not to be taken to imply that the first channel 40 is a bit-serial channel though this will often be the case.

A transmit-side processing system 23 cooperates with a receive-side processing system 33 to enable an error correction block 34 of the receive-side processing system 34 to correct the errors in the received data r thereby to recover the original subject data m. The transmit-side and receive-side processing systems 23, 33 can pass each other data items (herein generically referred to as 'auxiliary' data) over a second channel 45 via respective transceivers 22 and 32. The received data items output by each transceiver 22, 32 to the corresponding processing system 23, 33 are error free either because the channel is reliably error free or, more typically, because the transceivers 22, 32 employ suitable techniques that ensure error-free output from the receiving transceiver (such techniques comprise, for example, error detection coupled with resending of errored data items, or error correction effected using linear block codes or in some other manner).

In general terms the transmit-side and receive-side processing systems 23, 33 cooperate as follows to error correct the received data r:

1. Both processing systems 23, 33 base their operation on the same Tanner graph, that is, they carry out computations in accordance with a logical network of interconnected variable and sum nodes corresponding to the nodes and edges of the same Tanner graph. The Tanner graph is not fixed but, as will be more fully explained below, is independently created by each processing system 23, 33 in a pseudo-random but deterministic manner for each item (or group of items) of subject data m.

2. The transmit-side processing system 23 uses the Tanner graph to compute a target syndrome s from the subject data m, that is, the bits of the subject data m define the values applied to the variables nodes of the logical network specified by the Tanner graph and the ordered set of values produced by the modulo-2 summations at the sum nodes of the logical network form the target syndrome s.

3. The target syndrome s is sent by the transmit-side processing system 23 as auxiliary data over the channel 45 to the receive-side processing system 33.

4. The error-correction block 34 of the receive-side processing system 33 applies the Sum-Product algorithm (iterative belief propagation) to the logical network specified by the Tanner graph with the output values of the sum nodes being set by the target syndrome s received from the transmit-side processing system 23, and the initial values of the variable nodes being set by the bit values of the received data r and the error rate of channel 40.

5. On the Sum-Product algorithm producing, at the variable nodes of the logical network used by the error correction block 34, probable values that are consistent with the target syndrome s, these probable values are output as the subject data m.

The processing systems 23 and 33 are typically provided in the form of program controlled processors with supporting memory and input/output sub-systems, and functionally comprise the following blocks as is depicted in FIG. 4;

Functional blocks of the transmit-side processing system 23:
  a target syndrome determination block 24 for determining a target syndrome s by deriving an ordered plurality of modulo-2 summations of respective predetermined selections of bits of the subject data m, the predetermined selections being defined by the connection of sum nodes to variable nodes in a locally-created Tanner graph;

a graph creation block (a.k.a. network creation block) 25 for effecting pseudo-random, but deterministic, generation of a Tanner graph for use by the target syndrome determination block 24;

a syndrome-size determination block 27; and a control block 26 for coordinating transmit-side operation of the processing system 23 and the exchange of auxiliary data with the receive-side processing system 33.

Functional blocks of the receive-side processing system 23:

the error correction block 34 which as already outlined above provides an arrangement for correcting errors in the received data r by applying iterative belief propagation to adjust bit value probabilities of the received data r such that an ordered plurality of modulo-2 summations of the probable values of respective predetermined selections of bits of the received data r matches the target syndrome s received from the transmit-side processing system 23, the predetermined selections being defined by the connection of sum nodes to variable nodes in a Tanner graph that is a locally-created version of the Tanner graph used in the generation of the target syndrome;

a graph creation block (a.k.a. network creation block) 35 for effecting pseudo-random, but deterministic, generation of a Tanner graph for use by the error correction block 24; and a control block 36 for coordinating operation of the receive-side processing system 33 and the exchange of auxiliary data with the transmit-side processing system 23.

The general operation of the target syndrome determination block 24, and of the error correction block 34 will be well understood by persons skilled in the art from what has already been written and will therefore not be further described hereinafter except for a preferred 'end game' routine used by the error correction block for determining when the Sum-Product algorithm has run its useful course (see FIG. 18 and related description below). Instead, most of the remainder of the description of the FIG. 4 embodiment will concentrate on how the graph creation blocks (a.k.a. network creation block) 25, 35 of the processing systems 23, 33 generate suitable Tanner graphs for use by the blocks 24 and 34 respectively (it being understood that for a given item of subject data m, the graphs generated by the two graph creation blocks 25, 35 are arranged to be the same). In particular, a description will be given (with reference to FIGS. 6-17) of the generation of various example sub-classes of graph that all belong to a generic class of Tanner graphs hereinafter referred to as the "toroidal-web" class for reasons that will become apparent. The toroidal-web class of Tanner graph is characterised by a particular generic structure that is relatively easy to construct (and therefore suitable for dynamic graph creation) and that imparts specific characteristics to the resultant graphs. These graphs, which can all be mapped to a corresponding sparse parity check matrix, are suitable for use in effecting error correction on large messages—for example, one megabit long—by iterative belief propagation (in the same way that a Tanner graph of an LDPC code maps to a sparse parity check matrix and is suitable for use with iterative belief propagation).

The graph creation block 25 and 35 are both arranged to operate according to the same graph construction algorithm and it will be assumed that this algorithm is tailored to create a pre-selected sub-class of the toroidal-web class of graph; however, within the selected sub-class, this algorithm can generate a very large number of different Tanner graphs depending on the values of various parameters. The same parameter values must be used by both graph creation blocks 25, 35 for them to generate the same graph. These parameters comprise:

the size of the subject data item m (this may vary between subject data items m or be fixed in advance at a particular value the same for all subject data items m);

the size of the target syndrome s, or the value of a parameter determining this syndrome size (again, this value may be fixed but, as will be seen below, this is generally not advisable);

the parameters defining randomness in certain operations carried out during graph creation—these parameters may be shared secret random data (such as provided by shared one-time pads) or the parameters of operation (such as initialisation vector) of pseudo-random, and therefore deterministic, number generators PNGs (the values of these latter parameters would usually fixed though periodic synchronisation checking or re-initialisation is advisable).

Where a parameter of the graph creation algorithm is determined dynamically (that is, for each new subject data item m or group of such items), this is typically done by the transmit-side processing system 23 and the value communicated to the receive-side processing system 33 over the channel 45 as auxiliary data; it is however also possible, in appropriate circumstances, for the receive-side processing system 33 to determine the parameter value and send it to the transmit-side processing system 23, or for both processing systems 23, 33 to negotiate the value to be used.

It is also possible to arrange for the graph construction algorithm run by the graph creation blocks 25, 35 to be capable of constructing any of a plurality of the sub-classes of the toroidal-web class of graph, with the sub-class to be used being a further one of the dynamically determined graph-creation parameters.

In the following description of the FIG. 4 embodiment, it is assumed that only the syndrome size is dynamically determined, this being done anew for each subject data item m.

More particularly, the block 27 of the transmit-side processing system 23 determines the syndrome size in dependence on the current error rate of the noisy first channel 40. The error rate of the channel 40 is measured by comparing known transmitted data with the data actually received; the comparison can be done by either processing system 23 or 33 but in the present case is done by the block 27 of the transmit-side processing side, it being provided with the known transmitted data by the transmitter 21 and with the received data by the receive-side processing system 33 via the channel 45. It may be noted that the data used to determine error rate will generally need to be distinct from (or divided from) the subject data m since it gets passed over the channel 45 which does not possess the particular properties of the first channel 40 that justify the use of the channel 40 for sending the subject data m. (for example, in the case of channel 40 being a quantum signal channel, the channel 45 will not posses the reliable-detection-of-eavesdroppers property possessed by channel 40).

Once the block 40 has determined the error rate of channel 40, it uses this to determine the desired syndrome size and then passes this information to the graph-creation blocks 25 and 35. As already indicated, as an alternative, the block 27 could send the determined error rate to the receive-side processing system 33 to enable the latter to carry out its own determination of the syndrome size (this determination would be done in the same way as block 27 so that both graph creation blocks 25, 35 are provided with the same syndrome size value).

Figure 5:
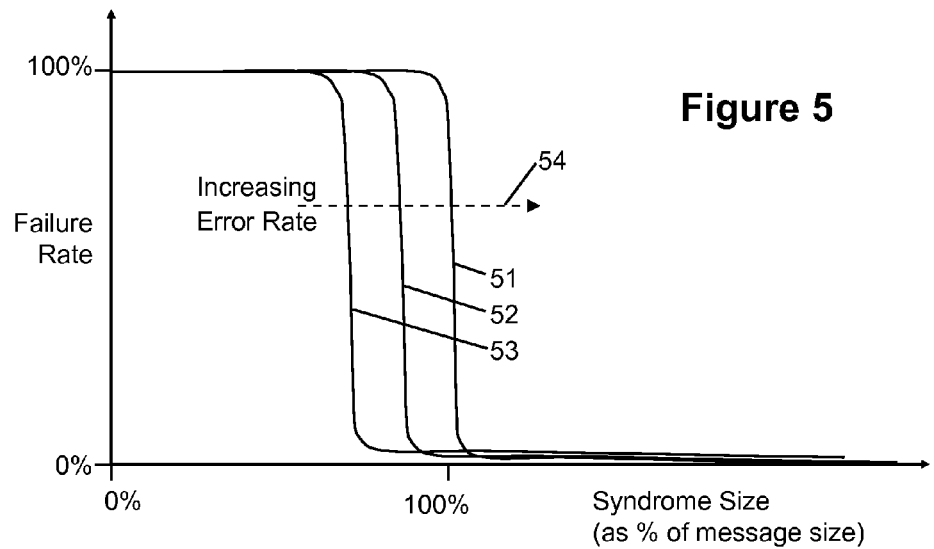
FIG. 5 is a graph illustrating the dependency of the failure rate of a Sum-Product algorithm implemented by the FIG. 4 system, on target syndrome size for different channel error rates.

The manner in which the block 27 determines the desired size of the target syndrome from the channel 40 error rate, will now be described with reference to FIG. 5. FIG. 5 is a graph showing, for different channel 40 error rates, the variation with syndrome size of the failure rate of an iterative belief propagation process (the process used by error correction block 34) applied to the sub-class of Tanner graph to be created by graph creation blocks 25, 35; in this context, failure rate refers to the failure of the iterative belief propagation process to produce probable values at the variable nodes of the Tanner graph that are consistent with the target syndrome. Syndrome size is specified in FIG. 5 as a percentage of the size of the subject data m and this percentage can be greater than 100%.

FIG. 5 shows three curves 51, 52, 53 each for a different channel 40 error rate, largest for curve 51 and smallest for curve 53. Each curve 51-53 has the same general step form indicating that below a certain size of target syndrome, the failure rate is substantially 100% whereas above a threshold syndrome size, the failure rate drops to a low level. As can be seen from curves 51-53, the threshold syndrome size increases with increasing error rate.

The syndrome size determination block 27 is arranged to select a syndrome size that for the determined channel 40 error rate, is above the threshold syndrome size whereby to ensure a low failure rate for the iterative belief propagation process to be effected by the error correction block 34. For reasons of efficiency, the syndrome size selected should only be a small percentage above the threshold size.

Consideration will next be given to the graph construction algorithm run by each graph creation block 25, 35 for constructing a graph of the pre-selected sub-class of the toroidal-web class of Tanner graphs for a given size p (bits) of subject data m and a given size q (bits) of target syndrome. In fact, regardless of the sub-class concerned, the graph construction algorithm involves the construction of a network of variable and sum nodes (that is, a respective variable node for each bit of the subject data m and a respective sum node for each bit of the target syndrome s) interconnected by edges and comprises two main phases, namely:

a first phase in which an equal number of variable and sum nodes (determined by the smaller of p and q) are organised into a continuum of cells covering a finite toroid, each cell being delimited by an equal number of variable and sum nodes alternately arranged and interconnected into a loop by edges; and a second phase in which a plurality of 'spider structures' are defined each comprising a node of one type, variable or sum, (depending on which type has not been fully used in the first phase) linked by a predetermined number of edges to randomly-selected nodes of the other type, sum or variable, that have already participated in defining the continuum of cells in the first phase.

The second phase is only needed if the number of subject data bits p differs from the number of target syndrome bits q. It will be appreciated that it is the edges that define the operative connections of variable nodes to sum nodes.

Graphs that can be created in accordance with the above generic graph construction algorithm make up the "toroidal web" class of graphs, the significance of this name now being apparent. Furthermore, the form and mutual relationship of the cells employed in the first phase of the graph construction algorithm determines the sub-class of the resultant graph.

Figure 6:
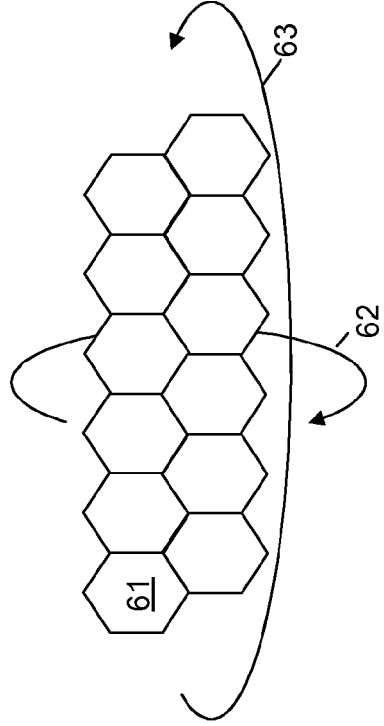
FIG. 6 is a diagram illustrating how a planar extent of cells can be wrapped around to form a toroidal continuum.
Figure 7:
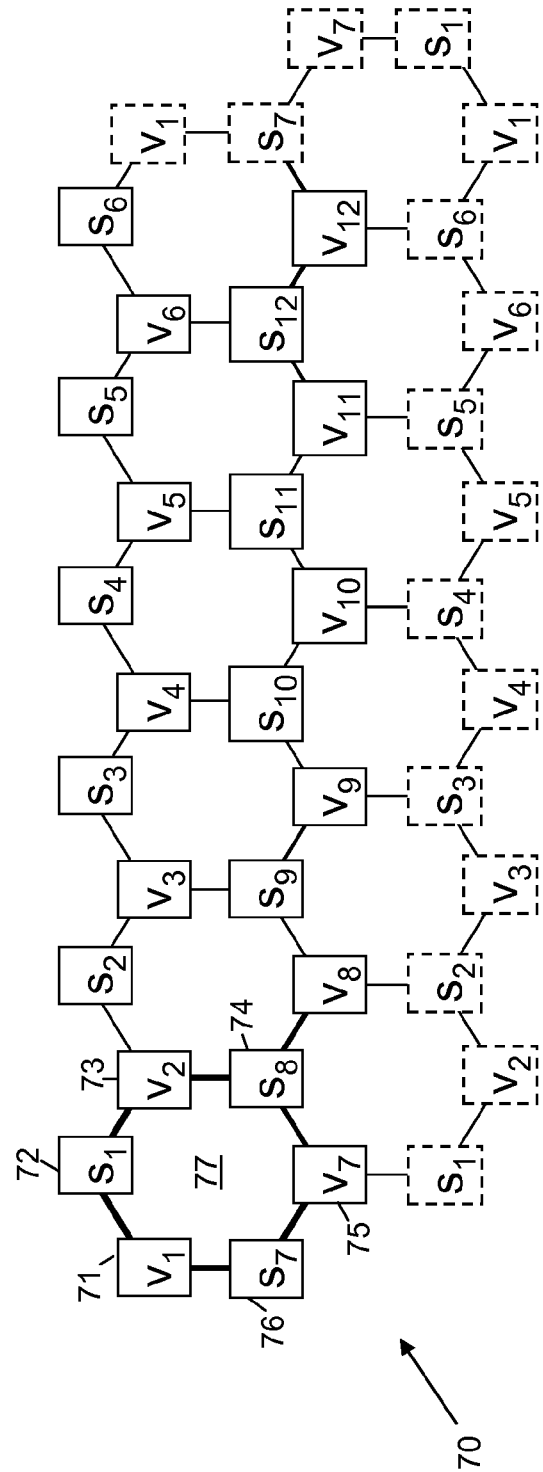
FIG. 7 is a diagram illustrating a network of variable and sum nodes interconnected by edges to define twelve hexagonal cells wrapped around to form a toroidal surface.
Figure 9:
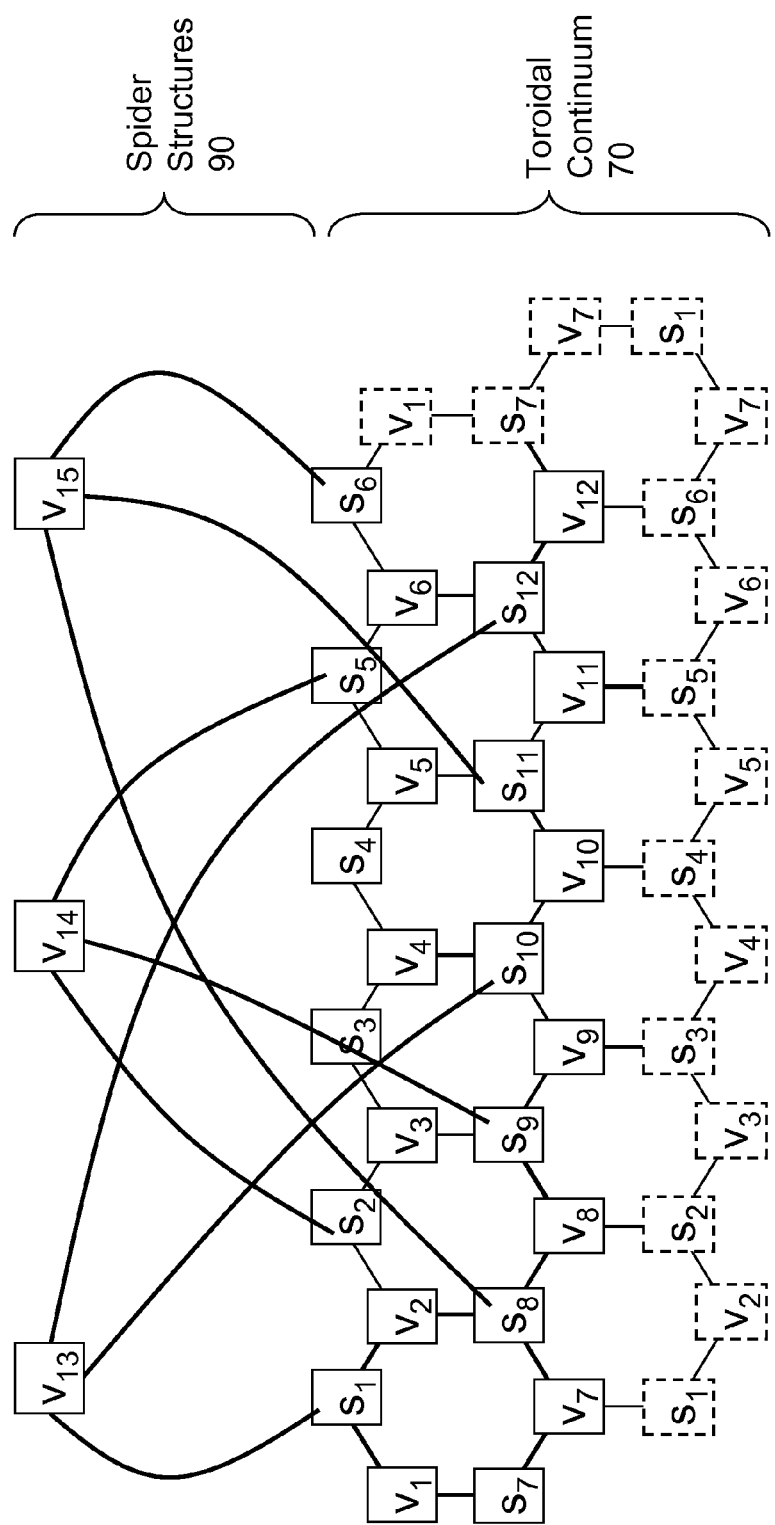
FIG. 9 is a diagram showing the FIG. 7 network expanded by the addition to the toroidal continuum, of spider structures of nodes and edges.

FIGS. 6, 7 and 9 illustrate a simple example in which a graph of a "hexagon" sub-class (so-called because the cells employed in the first phase of the graph construction are of hexagonal form) is created for a subject data size p of fifteen and a target syndrome size q of twelve. In this case, the first phase of graph construction involves organizing twelve variable nodes and twelve sum nodes to form twelve hexagonal cells 61 (see FIG. 6) arranged as two rows of six that are wrapped around end-to-end (arrow 63) and top-to-bottom (arrow 62) to form a continuum of cells covering a finite toroidal surface. FIG. 7 depicts the arrangement of nodes in more detail, the twelve variable nodes being referenced $v_1$ to $v_{12}$ and the twelve sum nodes being referenced $s_1$ to $s_{12}$. As can be seen, each hexagonal cell is formed from three variable nodes alternately arranged with three sum node; as an example, cell 77 comprises nodes 71 to 76 respectively: variable node $v_1$, sum node $s_1$, variable node $v_2$, sum node $s_8$, variable node $v_7$, and sum node $s_8$. The cells have common edges whereby each node actually participates in delimited three cells. The wrapping around of the cells to form the toroidal continuum of cells 70 is indicated by the repetition (in dotted outline) of the top row of nodes (nodes $v_1$, $s_1$, $v_2$, $s_2$, $v_3$, $s_3$, $v_4$, $s_4$, $v_5$, $s_5$, $v_6$, $s_6$) as the bottom row of nodes, and by the repetition of the leftmost column of nodes ($v_1$, $s_7$, $v_7$, $s_1$) as the rightmost column of nodes.

Figure 8:
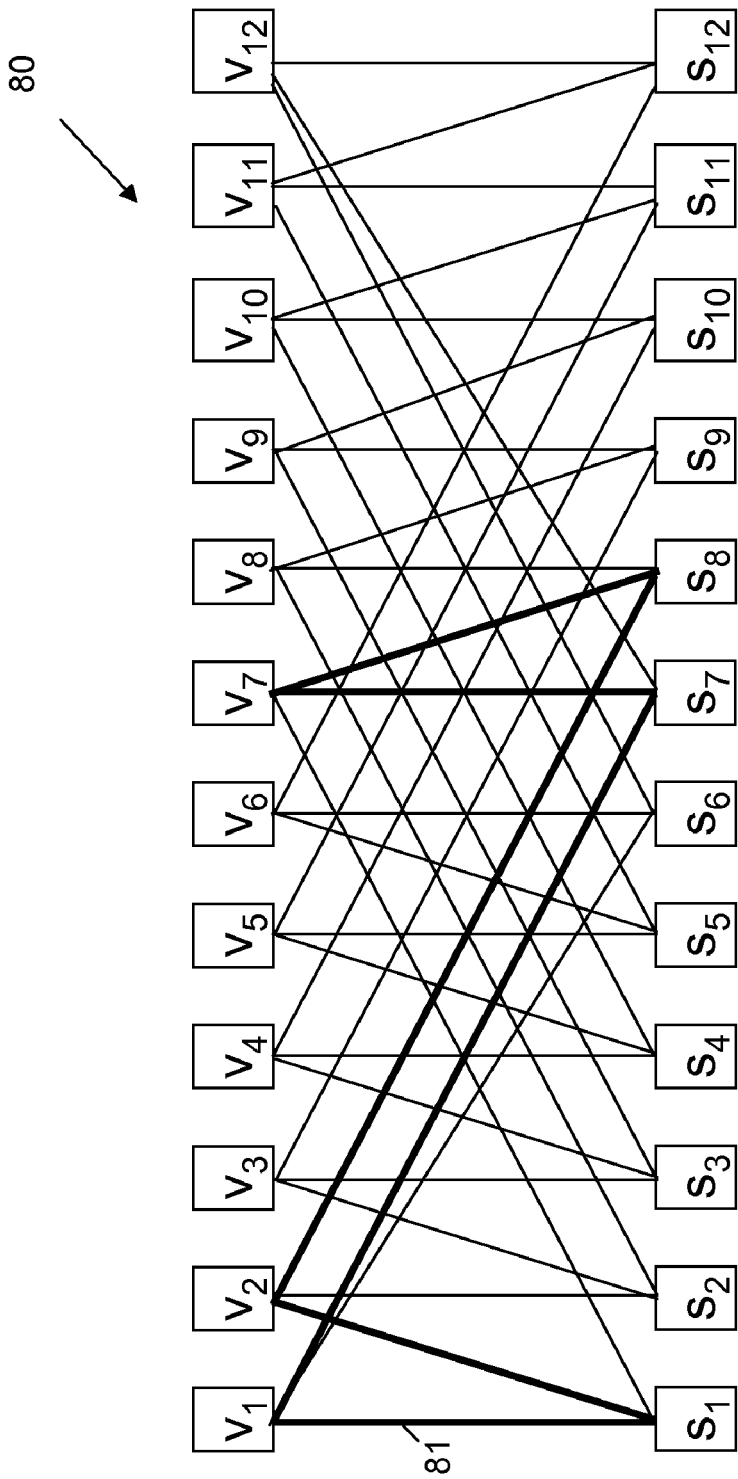
FIG. 8 is a Tanner graph representation of the constraints defined by FIG. 7 network of nodes and edges.

FIG. 8 is a re-drawing of the FIG. 7 network of nodes and edges into a form 80 more commonly used for the depiction of Tanner graphs (as used, for example, in FIG. 3) with the variable nodes $v_1$ to $v_{12}$ arranged in order at the top and the sum nodes $s_1$ to $s_{12}$ arranged in order along the bottom. The edges that define the cell 77 in FIG. 7 have been shown in bold in FIG. 8 (see 81). It should be remembered that FIG. 7, and therefore FIG. 8, only represents a partially complete graph for the example under consideration.

It should also be noted that while in visual depictions of Tanner graphs the ordering of the variable nodes generally corresponds to the ordering of bits in the subject data, in the FIG. 8 re-drawing of the FIG. 7 network the ordering of the variable nodes is according to their suffix numbering which, as will be described hereinafter, may or may not correspond to the ordering of bits in the subject data m. Where the numbering of the variable nodes as shown in FIG. 7, does not correspond with the place positions of the associated bits of the subject data m, then a re-drawing of FIG. 7 with the variable nodes ordered according to the ordering of the associated bits of the subject data m will likely not clearly reveal the underlying structural regularity.

In the second phase of graph construction, the three excess variable nodes not involved in the first phase (nodes $v_{13}$, $v_{14}$, $v_{15}$) are linked into the toroidal continuum 70 of hexagonal cells. This is achieved as follows. Each of the three excess variable nodes $v_{13}$, $v_{14}$, $v_{15}$ is taken in turn and are specified to connect the node to three randomly chosen sum nodes (which are already incorporated into the toroidal continuum 70). In visual terms and as depicted in FIG. 9, each of the excess variable nodes $v_{13}$, $v_{14}$, $v_{15}$ becomes the body of a three-legged spider structure 90 connecting the node to the toroidal continuum 70; thus, FIG. 9 shows the excess variable node $v_{13}$ as linked to the sum nodes $s_1$, $s_{10}$ and $s_{12}$, the excess variable node $v_{14}$ as linked to the sum nodes $s_2$, $s_5$ and $s_9$, the excess variable node $v_{15}$ as linked to the sum nodes $s_6$, $s_8$ and $s_{11}$. Preferably, the random assignment of sum nodes to the excess variable nodes is done by creating a randomly organised list of the sum nodes and taking a trios of sum nodes off the top of the list for each excess variable node $v_{13}$, $v_{14}$, $v_{15}$ in turn; in cases where the number of excess variable nodes results in exhaustion of the list of sum nodes before all spider structures 90 have been created, the process is repeated for the remaining variable nodes with a new randomized list of the sum nodes (this being done as many times as is necessary).

It will be appreciated that in cases where the number q of syndrome bits (and therefore sum nodes) is greater than the number p of subject data bits (and therefore variable nodes), the roles of the variable and sum nodes are reversed in the above description of the second phase of graph construction. Furthermore, the number of legs of each spider structure is not limited to three, with four being a preferred number.

It will be appreciated that construction of the spider structures in the above manner produces a pseudo-random but fairly even distribution of 'legs' over the toroidal continuum 70, adding randomness to the regular (and therefore efficiently constructible) toroidal continuum 70).

Since cycles of length 4 are generally undesirable in Tanner graphs, a check is preferably made for each new spider structure 90 has not resulted in the creation of a cycle of length 4; if such a cycle is produced, the spider structure is rejected and a new one created in its place. Checking for four cycles is fairly simply done as follows:
  (i) a check is made that the 'feet' of the new spider structure (that is, the nodes of the toroidal continuum linked directly to the excess node forming the spider body) are separated from each other across the toroidal continuum by more than one intervening node;
  (ii) a check is also made that no two feet of the new spider structure match (i.e. are the same nodes as) two feet of another spider structure.

Figures 10, 11:
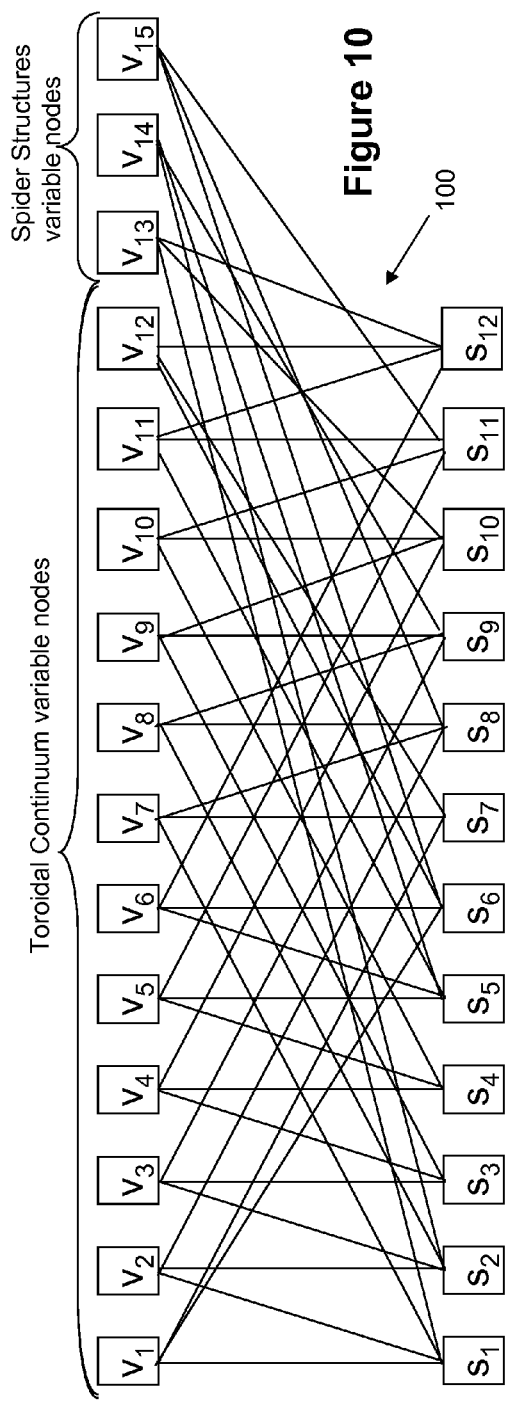
FIG. 10 is a Tanner graph representation of the constraints defined by FIG. 10 network of nodes and edges.
FIG. 11 is a parity-check matrix representation of the constraints defined by the FIG. 9 network of nodes and edges.

FIG. 10 is a re-drawing of the FIG. 9 network (both the toroidal continuum 70 and the spider structures 90) into a form 100 more commonly used for the depiction of Tanner graphs. FIG. 10 represents the complete hexagon sub-class graph constructed for the example under consideration. Again, however, it should be noted that this re-drawing, like that shown in FIG. 8, the ordering of the variable nodes is according to their suffix numbering which may or may not correspond to the ordering of bits in the subject data m.

In fact, the association of the bit positions of the subject data item m with the variable nodes of the FIG. 9 network can be either predetermined (for example, in accordance with the node numbering indicated by the node suffixes, though other predetermined patterns of association are also possible), or can be determined pseudo-randomly (in a deterministic manner capable of carried out at both graph creation blocks 25, 35 independently). As regards the sum nodes, all that is required is that the ordering used by the target syndrome determination block 24 in generating the target syndrome s is also used by the error correction block 34 when making use of the target syndrome.

FIG. 11 shows the parity check matrix $H_2$ (reference 110) corresponding to the FIG. 10 graph (and, of course, also to the FIG. 9 network) for a node-suffix based association of bit positions of the subject data m to the variable nodes. FIG. 11 is presented to illustrate that this matrix is a sparse one. As already explained, each row of the matrix $H_2$ identifies a selection of subject data bits that must sum, modulo-2, to the value of the corresponding target syndrome bit.

Figure 12:
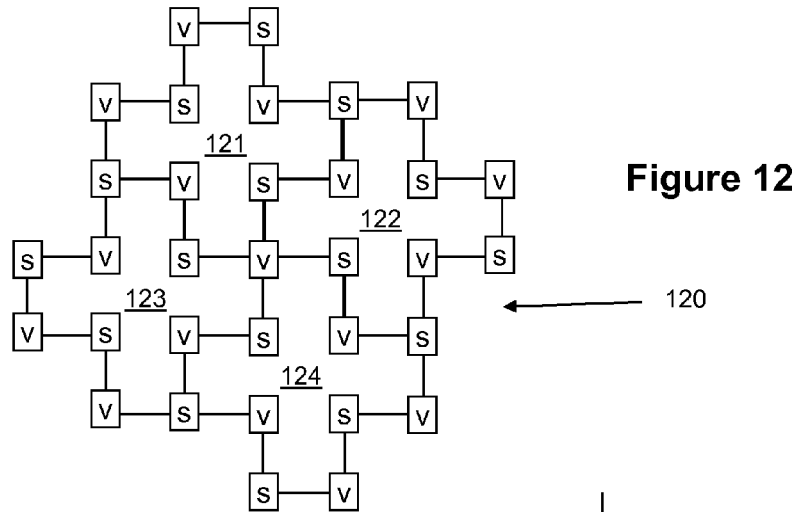
FIG. 12 is a diagram illustrating a network of nodes and edges defining a plurality of cruciform cells.
Figure 13:
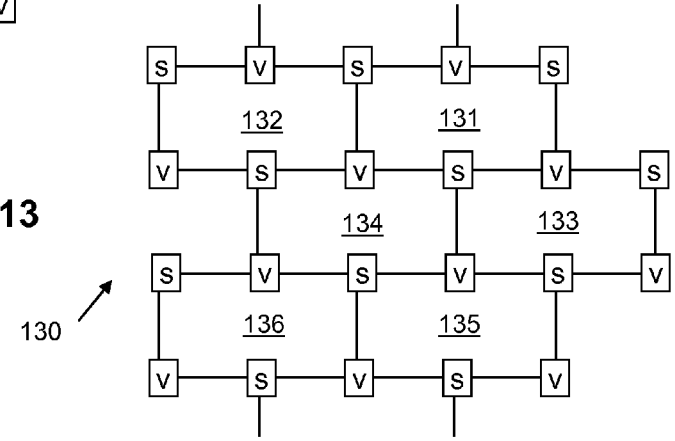
FIG. 13 is a diagram illustrating a network of nodes and edges defining an offset arrangement of six-node rectangular cells.
Figure 14:
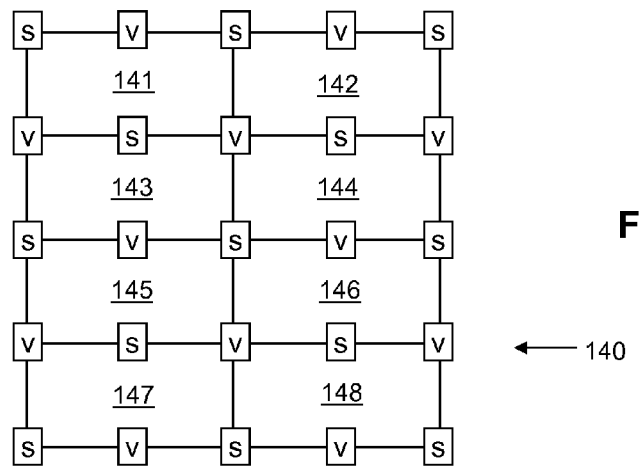
FIG. 14 is a diagram illustrating a network of nodes and edges defining a non-offset arrangement of six-node rectangular cells.

The foregoing example of a graph of the toroidal web class was of a "hexagon" sub-class graph, that is, one in which the toroidal continuum is made up of hexagonal cells. FIGS. 12 to 14 illustrate the use of different forms of cell for constructing toroidal continuums of further respective sub-classes of the toroidal web class of graph. Thus:

FIG. 12 illustrates a toroidal continuum portion 120 of a "cruciform" sub-class of graph, this portion 120 being made up of four cruciform cells 121-124, each comprising six variable nodes alternately arranged with six sum nodes with which they are interconnected by edges. In a complete continuum, every third node around the boundary of a cell is shared by three adjacent cells and is linked by edges to four other nodes two of which are of the same cell. The other nodes of a cell are linked only to nodes of the cell concerned.

FIG. 13 illustrates, for purposes of comparison with the FIG. 14 example, a toroidal continuum portion 130 of the "hexagonal" sub-class graph, but with the hexagonal cells re-drawn as offset six-node rectangles. The illustrated toroidal continuum portion 130 is made up of six six-node rectangular cells 131-136 arranged in three rows with the middle row being horizontally offset relative to the other two. Each cell 131-136 comprises three variable nodes alternately arranged with three sum nodes with which they are interconnected by edges. For each cell, four nodes are disposed at cell vertices and (in a complete continuum); these nodes are shared by two other cells and connect with three other nodes two of which are of the same cell. The remaining two nodes of the cell are disposed midway along respective sides of one pair of opposite sides of the cell; these nodes are also shared by two other cells and connect with three other nodes two of which are of the same cell.

FIG. 14 illustrates a toroidal continuum portion 140 of a "non-offset six-node rectangle" sub-class of graph, this portion 130 being made up of six six-node rectangular cells 131-136 individually of the same form as the six-node rectangles of the FIG. 13 example but arranged in non-offset rows. In this case, in a complete continuum, for each cell the four nodes disposed at cell vertices are shared with three adjacent cells and connect with three other nodes of which are of the same cell; each of the remaining two nodes of the cell only connect with two nodes of the cell concerned.

It will be appreciated that the "shape" of a cell is primarily a convenience for describing a visual representation of the logical network; what is important is the interconnection of the cell nodes to each other.

Figure 15:
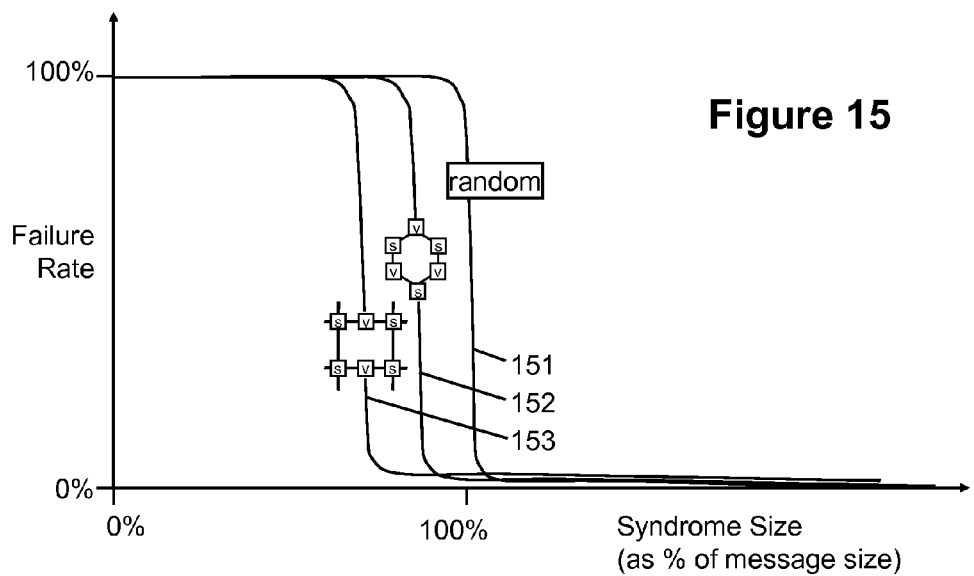
FIG. 15 is a graph illustrating the dependency of the failure rate of the Sum-Product algorithm implemented by the FIG. 4 system, on target syndrome size for different network constructions.

FIG. 15 is a graph, similar to that of FIG. 5, showing, for different forms of Tanner graph, the variation with syndrome size of the failure rate of an iterative belief propagation process (the process used by error correction block 34) applied to the Tanner graph concerned, the channel error rate being the same in all cases. More particularly, curve 151 is for a 'random' graph (that is, one without any structure but with any 4-cycles eliminated); curve 152 is for a "hexagon" sub-class of graph; and curve 153 is for a "non-offset six-node rectangle" sub-class graph. As can be seen, the syndrome threshold value (where the step occurs in each curve) is smaller for both represented sub-classes of the toroidal web class of graph than the reference threshold provided by the random graph; this has been found to be generally the case indicating that graphs of the toroidal web class provide enhanced performance (smaller required syndrome size for a given channel error rate) compared to the random-graph reference. In particular, graphs of the "non-offset six-node rectangle" sub-class have been found to give the best performance.

Figure 16:
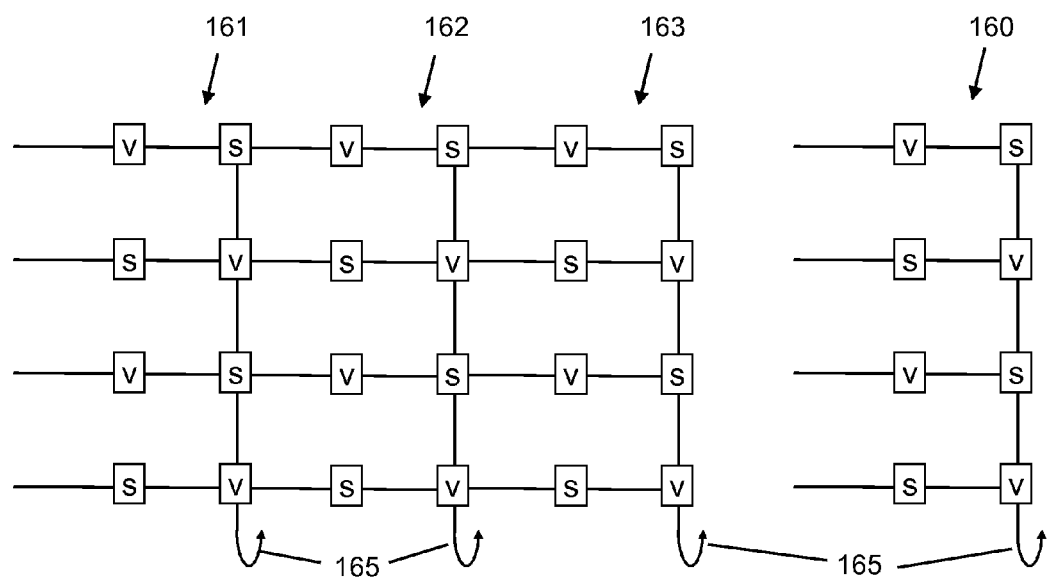
FIG. 16 is a diagram illustrating how the preferred arrangement of cells illustrated in FIG. 14 can be built up from a standard building block of nodes and edges.

FIG. 16 depicts how the toroidal continuum of a "non-offset six-node rectangle" sub-class graph can be readily constructed from a standard building block 160 of nodes and edges. More particularly, the building block 160 comprises a line of two sum nodes and two variable nodes arranged alternately and interconnected by edges, the end nodes also being interconnected by an edge (represented in FIG. 16 by arrow 165). Each node of this line of alternating sum and variable nodes (herein a "line node") has a side branch of an edge connecting to another node with a free edge intended to connect to a line node of another building block. The left-hand side of FIG. 16 shows three such building blocks 161, 162, 163 already assembled by the connecting the free edges of one building block to corresponding line nodes of the adjacent building block. When sufficient building blocks have been inter-connected in this way to provide a number of sum or variable nodes equal to the smallest of p (number of subject data bits) and q (number of syndrome bits), the free ends of the first building block (block 161 in FIG. 16) are wrapped around to connect with the line nodes of the most-recently added building block (block 163 in FIG. 16) thereby to close and complete the toroidal continuum. It will be appreciated that the toroidal continuum so formed is like a long thin tube joined end-to-end (assuming any reasonable sized subject data item m).

Of course, the number of nodes of one type (sum or variable) in a toroidal continuum so constructed will be an integer multiple of four whereas the value of the smallest of p and q may not be an integer multiple of four. Various strategies can be adopted to handle this; for example, the number q of syndrome bits can always be chosen to be an integer multiple of four and for cases where it is the number p of subject data bits that is the smaller of p and q, then either an appropriate number of subject data bits can be dropped (suitable in certain cases such as in the case of the QKD example to be described hereinafter) or an appropriate number of dummy subject data bits can be added.

It will be appreciated that the foregoing building block approach to toroidal continuum construction can be adapted to other sub-classes of graph of the toroidal web class and that such adaptation is within the competence of persons of ordinary skill in the art.

To pull together and summarize the main points discussed above concerning graph generation and use, a description will now be given, with reference to FIG. 17, of the operation of the receive-side processing system 33 upon being provided with the received data r by the receiver 32.

First in an initial step 171, the receive-side processing system 33 acquires the values of the graph parameter(s) that are not predetermined; in the present example, it is assumed that the number of bits p in the subject data m are predetermined as is the sub-class of toroidal web graph to be generated and the parameters of the pseudo-random number generators used during graph generation. The sole dynamic parameter that is acquired in step 171 in the present example is the syndrome size q which is derived by the receive-side processing system 33 from the error rate of channel 40, this error rate being provided in auxiliary data passed over channel 45 from the transmit-side processing system 23.

Figure 17:
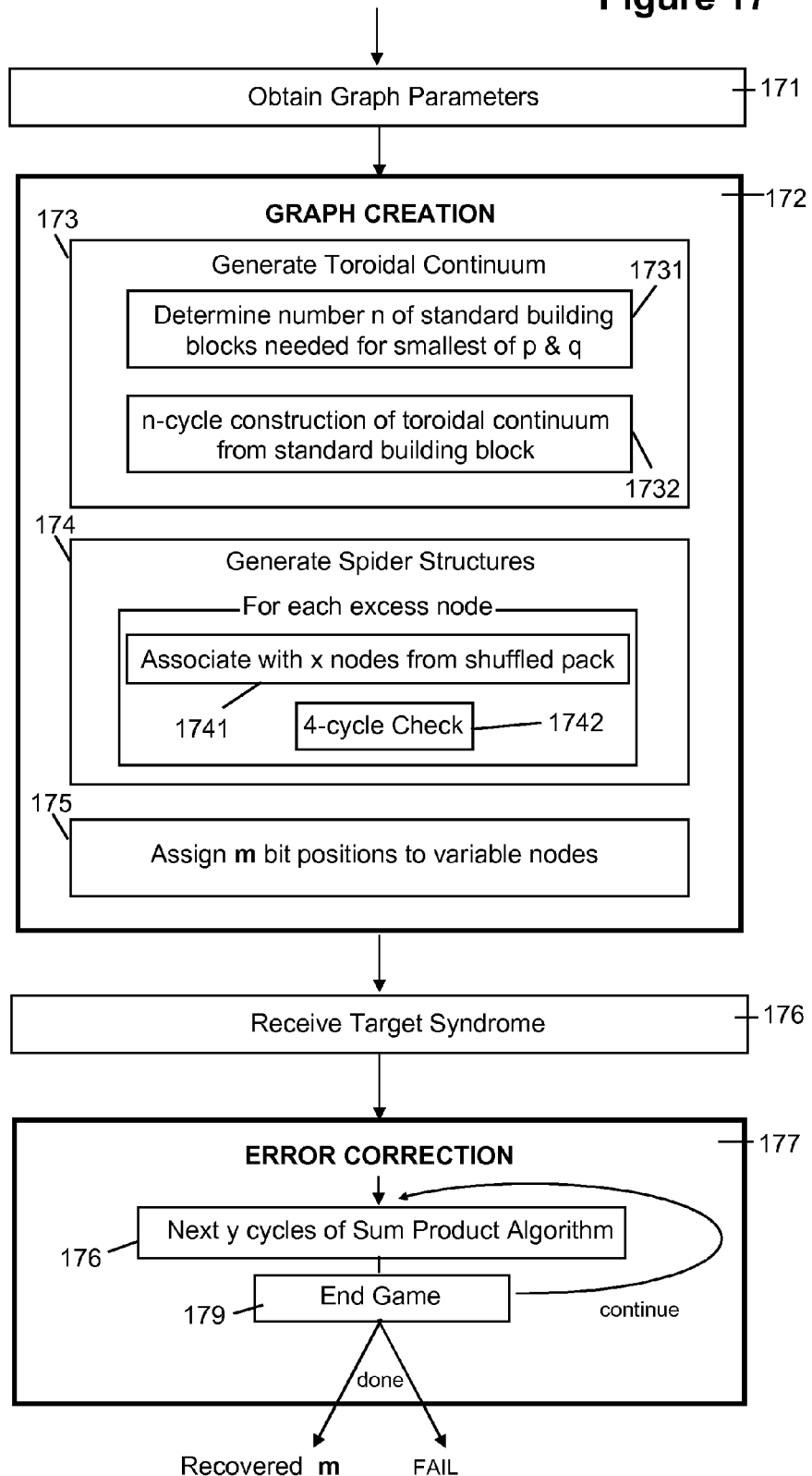
FIG. 17 is a flow chart illustrating operation of a receiving apparatus of the FIG. 4 system.

Thereafter, the receive-side processing system 33 proceeds with graph generation (block 172 in FIG. 17). As described above, the first phase of graph generation is the generation of the toroidal continuum; this is effected by first determining, in step 1731, the number n of standard building blocks (such as building block 160 of FIG. 16 for the "non-offset six-node rectangle" graph sub-class) needed to provide a number of sum/variable nodes corresponding to the smallest of p and q. Once the value of n has been determined then n cycles of building block addition are carried out, in step 1732, to connect together n building blocks to form the required toroidal continuum.

The second phase of graph generation is the generation of the appropriate number of spider structures, one for each excess node (that is, one for each required sum/variable node not already provided by the toroidal continuum)—see block 172 in FIG. 17. The excess nodes are all of one type and in step 1741 each such excess node is associated (logically connected by an edge or 'spider leg') with x (for example, four) nodes of the other type taken off the top of a randomly shuffled pack of these nodes (all in the toroidal continuum). A four cycle check is carried out in step 1742 for each excess node newly connected into the toroidal continuum.

The final phase of graph generation is the assignment, in step 175, of the bit positions of the data item m to the variable nodes of the graph.

Following graph generation, which takes place at substantially the same time in both the transmit-side and receive-side processing systems 23, 33, the receive-side processing system 33 receives the target syndrome s in auxiliary data passed to it over channel 45 from the transmit-side processing system 23 (see step 176).

The receive-side processing system 33 can now proceed with error correction of the received data r using the Sum-Product algorithm (see block 177 in FIG. 17) to adjust the probable values of the received data bits to be consistent with the target syndrome s. In the present case, after every y cycles 178 of the Sum-Product algorithm (where y is, for example, four), an "end game" routine 179 is executed to determine whether the Sum-Product algorithm has reached a conclusion (be this a successful recovery of the original data m or a failure that cannot be corrected by further Sum-Product cycles), or whether further Sum-Product cycles should be effected; in the latter case processing returns to step 178.

Whereas in many applications, a successful conclusion can be judged achieved when the probable values at the variable nodes are consistent with the target syndrome s, some applications require even greater assurance, it being understood that there exists the possibility that consistency with the target syndrome can result from probable v-node values that do not match the bit values of the original data m. The end game routine can take account of this possibility by including a check based on a checksum derived from the original data m, it being appreciated that in order to carry out this check the receive-side processing system 33 must be provided with the correct checksum from the transmit-side processing system 23 (for example, in the auxiliary data passed in step 176).

As well as determining whether or not the Sum-Product algorithm has run its useful course, the end game routine can also be arranged, in situations where the probable values at the variable nodes are nearly consistent with the target syndrome, to seek to achieve consistency by adjusting selected v-node values in dependence on recognised patterns of errored sum nodes (that is, sum nodes where the value resulting from the current probable v-node values differs from the target syndrome value for that sum node). This correction process based on recognizing patterns of errored sum nodes will be more fully described hereinafter.

A preferred form of "end game" routine 179 will now be described with reference to FIG. 18 and incorporates both the above-mentioned checksum check and the correction process based on recognizing patterns of errored sum nodes.

Figure 18:
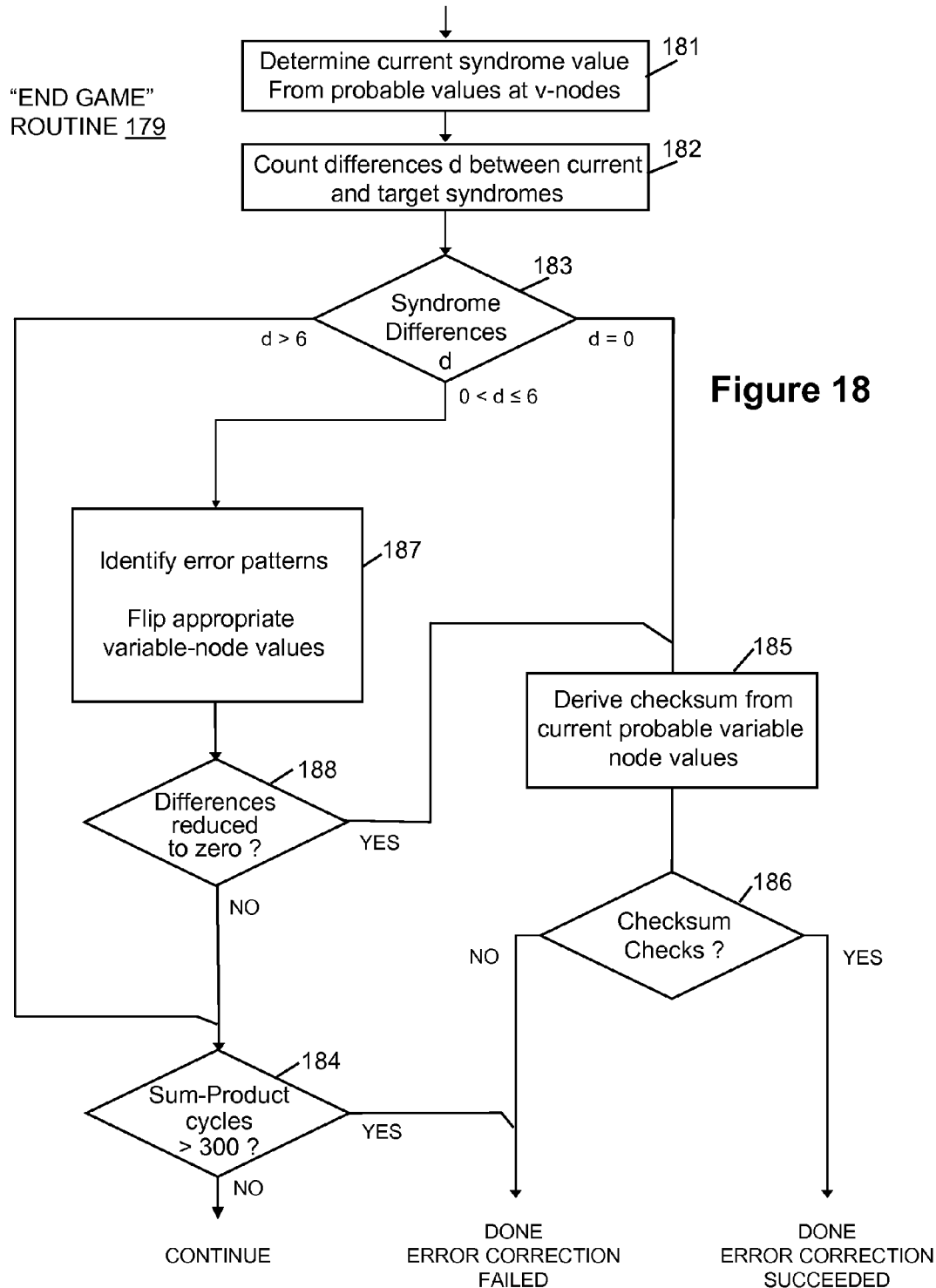
FIG. 18 is a flow chart illustrating a preferred form of end-game routine carried out during an error correction phase of the FIG. 17 flow chart.

The FIG. 18 end game routine starts by determining the probable values currently present at the variable nodes of the operative graph, and then using these values to derive a current syndrome, that is, the values at the sum nodes of the graph, assuming that these nodes are not tied to the target syndrome values (see step 181). This current syndrome is then compared with the target syndrome s to determine the number d of bits that are different (step 182).

If the number of syndrome differences d is greater than, for example, six (checked in step 183), it is judged that further Sum-Product cycles are required; however if an upper threshold number (for example, three hundred) of such cycles have already been carried out (checked for in step 184) convergence to a set of probable v-node values consistent with the target syndrome s is unlikely to be achieved by further Sum-Product cycles so error correction is stopped and judged a failure.

If step 183 determines that there are no syndrome differences (d=0), that is, the probable v-node values are consistent with the target syndrome s, then in step 185 a checksum is formed from the probable v-node values (taking account of any reordering needed to put the v-node values in an order corresponding to the received data r) and compared in step 186 with the checksum formed from the original data m. If the checksums match then error correction is terminated as successful and the probable v-node values output as the recovered subject data m (again, after any needed re-ordering). However, if the checksums do not match, then error correction is terminated as unsuccessful since further Sum-Product cycles are unlikely to result in convergence on the correct set of v-node values.

If step 183 determines that the number of syndrome differences d is in the range one to six ($0<d\leq6$), then the above-mentioned correction process based on recognizing patterns of errored sum nodes is carried out (step 187) with selected v-node values being flipped. If this value flipping results in the number of syndrome differences being reduced to zero (checked in step 188), the checksum creation and comparison steps 185, 186 are carried out; however, if the number of syndrome differences is not reduced to zero by the value flipping, further Sum-Product cycles are carried out (subject to the upper threshold check of step 184) starting from the v-node probabilities existing immediately prior to the current execution of the end game routine.

With regard to the correction process based on recognizing patterns of errored sum nodes (step 187), FIGS. 19 to 25 show respective patterns of errored sum nodes for the "non-offset six node rectangle" sub-class of toroidal web graphs; the errored sum nodes making up each pattern being the sum nodes ringed by bold solid circles. These patterns are systematically searched for in step 187 and upon a pattern being detected, the bit values associated with certain variable nodes are identified as candidate errored values and are therefore flipped; these variable nodes are those that, for the pattern recognised, will, if changed in value, eliminate the incorrect values at the sum nodes in the pattern concerned—these variable nodes are shown ringed by dotted circles in FIGS. 19 to 25. Thereafter, the search is continued until the whole graph has been searched or the number of corrected sum node values equals the original number of syndrome differences.

Figure 19:
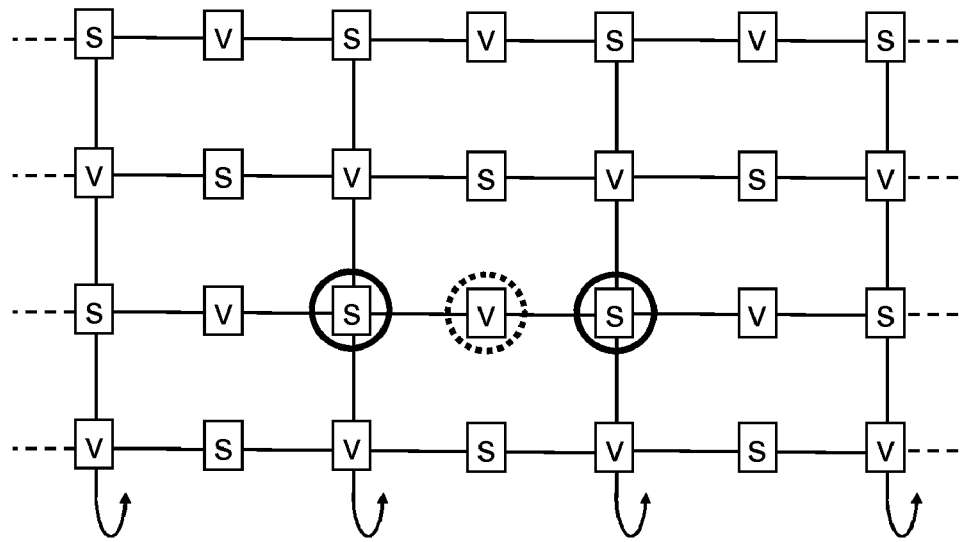
FIGS. 19 to 25 are diagrams of respective candidate syndrome error patterns.
Figure 20:
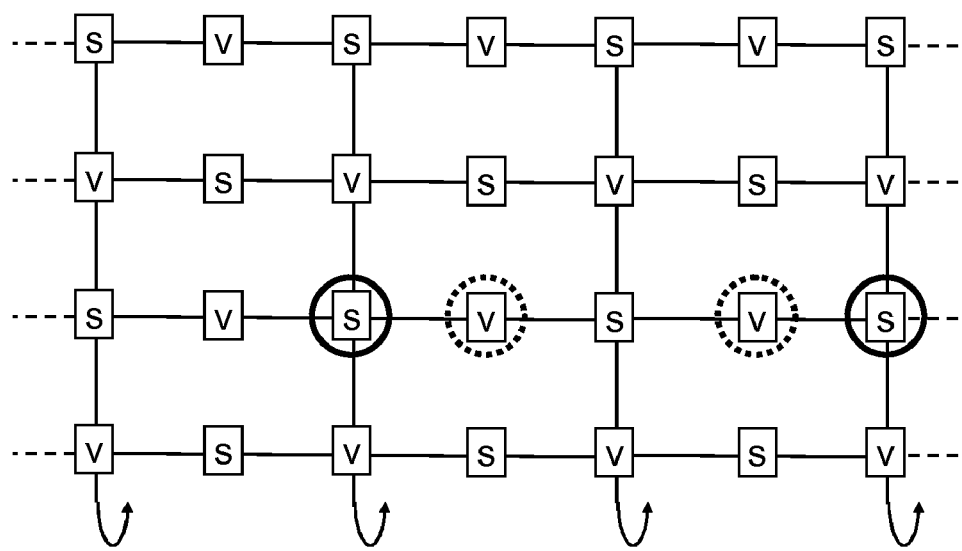

In FIGS. 19 to 25, the patterns are arranged according to how many errored sum nodes are involved. For convenience, non-limiting descriptive labels have been given to each pattern. Thus:

FIGS. 19-20 show respective patterns each involving only two errored sum nodes, the patterns being labelled:
"2s—Linear Adjacent"
"2s—Linear Trio Ends"

Figure 21:
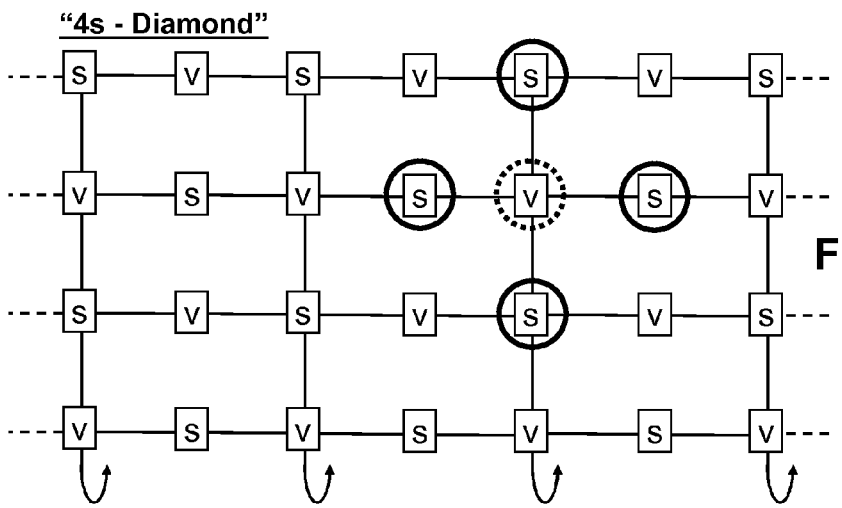
Figure 22:
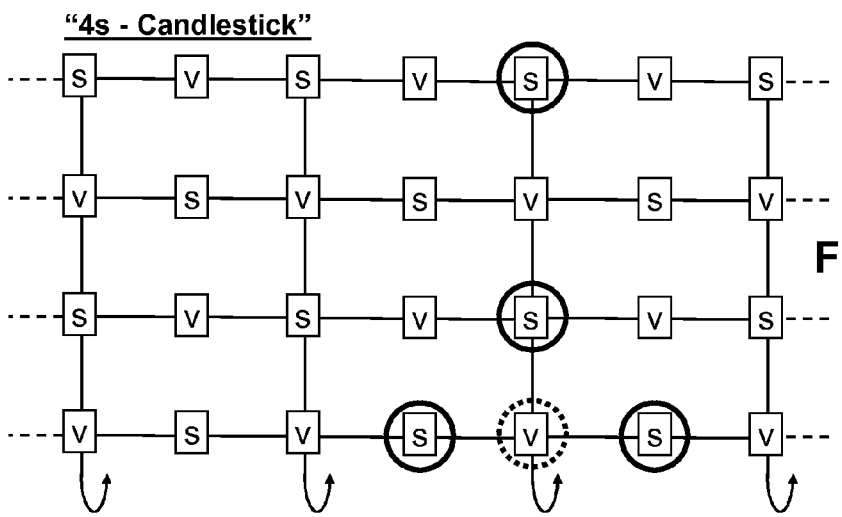
Figure 23:
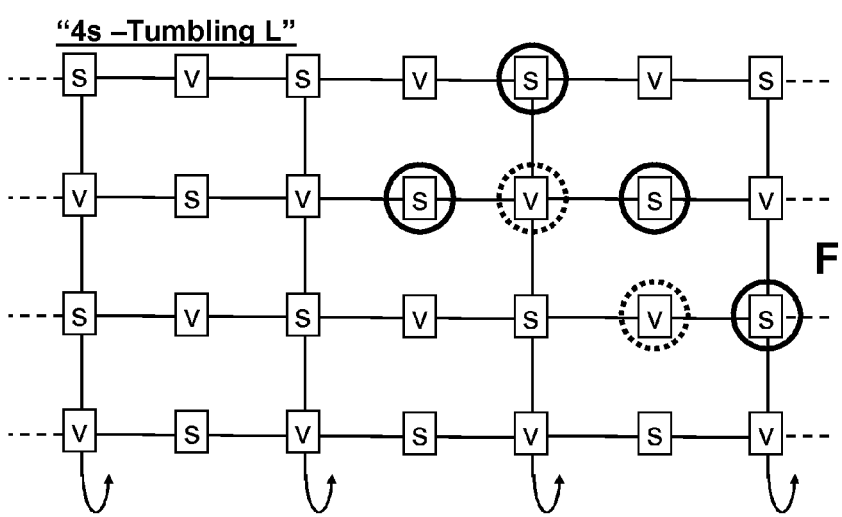

FIGS. 21-23 show respective patterns each involving four errored sum nodes, the patterns being labelled:
"4s—Diamond"
"4s—Candlestick"
"4s—Tumbling L"

Figure 24:
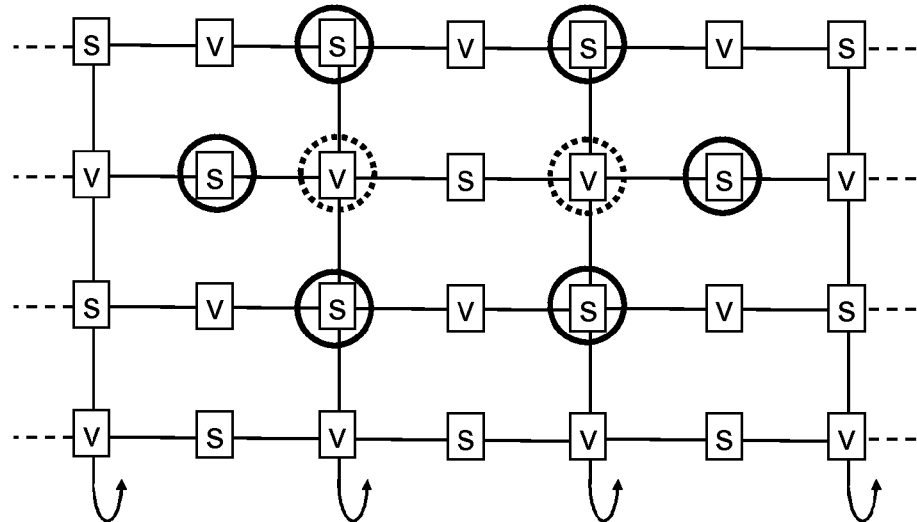
Figure 25:
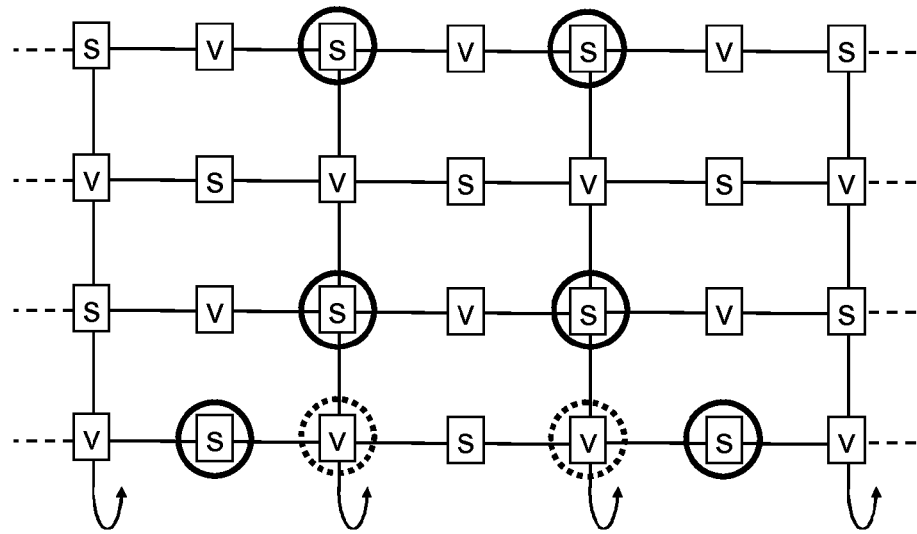

FIGS. 24-25 show respective patterns each involving six errored sum nodes, the patterns being labelled:
"6s—Hex"
"6s—Funnel"

Of course, it will be appreciated that although the labels given above make reference to a particular visual appearance of the pattern of errored sum nodes, visual appearance is really inconsequential as it depends on a particular visual depiction of the underlying logical network of nodes and edges and many alternative depictions are possible. A particular pattern of errored sum nodes is fundamentally defined, not by any visual pattern that a given depiction may throw up, but by the pattern of inter-relationships of the sum nodes concerned.

By way of example, the simple "2s—Linear Adjacent" pattern of FIG. 19 is made up of two errored sum nodes connected via a single variable node that has no other connections. For the "2s—Linear Adjacent" pattern, the bit value associated with the variable node positioned between the errored sum nodes is therefore a candidate errored value since flipping this value will flip the values of the errored sum nodes but no other sum nodes. Similarly in the "2s—Linear Trio Ends" pattern of FIG. 20, two errored sum nodes are connected by a line of edges and nodes comprising two variable nodes straddling an un-errored sum node with the variable nodes only connecting to the straddled sum node and respective ones of the errored sum nodes; the bit values associated with both variable nodes are therefore candidate errored values since flipping these values will flip the values of the errored sum nodes but no other sum nodes.

It may be noted that the "4s—Candlestick" pattern of FIG. 22 is actually the same basic pattern as the "4s—Diamond" pattern of FIG. 21 because the toroidal continuum of the graph concerned wraps around top to bottom; however, the patterns are different if searching is effected using the 'bottom' row of nodes (as illustrated) as a reference. For each pattern, four errored sum nodes are inter-connected via a single intermediate variable node, and the bit value associated with the intermediate variable node is therefore a candidate errored value since flipping this value will flip the values of the errored sum nodes but no other sum nodes.

The same applies to the "6s—Hex" and "6s—Funnel" patterns of FIGS. 24 and 25. In this case each pattern comprises:
a first pair of errored sum nodes linked by a trio of nodes comprising two variable nodes straddling an intermediate un-errored sum node, each variable node being linked to the intermediate sum node and to a respective one of the errored sum nodes of the first pair,
a second pair of errored sum nodes linked via a single intermediate variable node that has no other links, each errored sum node of the second pair also being linked to a respective one of the variable nodes of said trio of nodes linking the first pair of errored sum nodes; and
a third pair of errored sum nodes linked via a single intermediate variable node that has no other links, each errored sum node of the third pair also being linked to a respective one of the variable nodes of said trio of nodes linking the first pair of errored sum nodes.

The bit values associated with the two variable nodes of the trio of nodes linking the first pair of errored sum nodes are therefore candidate errored values since flipping these value will flip the values of the errored sum nodes but no other sum nodes.

The more complex patterns (that is, those involving more errored sum nodes) are preferentially searched for since a simple pattern such as the "2s—Linear Adjacent" pattern of FIG. 19, may in fact simply be part of a more complex pattern such as any of the four errored sum nodes of FIGS. 21 to 23.

The patterns of errored sum nodes illustrated in FIGS. 19 to 25 are not intended to be an exhaustive set of such patterns and step 187 can be arranged to search for any desired set of possible patterns. Furthermore, whereas all the patterns of errored sum nodes so far described are patterns to be found in the toroidal continuum of the graph concerned, it is also possible to search for patterns involving the 'spider structures' of the graph. In particular, where p>q so that the node at the centre of each spider structure is a variable node v, then a pattern of errored sum nodes corresponding to the 'feet' of all the legs of a spider structure, indicates that the subject data bit at the centre of the spider structure is likely in error and should be flipped. Preferably, such errored sum node patterns are searched for first (for example, by checking each spider structure in turn).

As already noted, the patterns illustrated in FIGS. 19 to 25 are applicable to the "non-offset six node rectangle" sub-class of toroidal web graphs; similar patterns of errored sum nodes for other sub-classes of toroidal web graphs will be readily derivable by persons of ordinary skill in the art.

It will be understood by persons skilled in the art that data representing the patterns of errored sum nodes (and the candidate errored variable node or nodes associated with each pattern) are stored by the receiving apparatus for each type of graph that the apparatus is intended to handle; such data may be pre-installed or loaded as needed. It will also be appreciated that identifying candidate errored variable nodes is effectively the same as identifying candidate errored bits of the received data (as adjusted by application of the Sum-Product algorithm) because of the predetermined association of received data bit positions to variable nodes.

Example Application

Error Correction in QKD System Used for One-Time Pad Replenishment

An example application of the above described error correction method and arrangements will now be described with reference to FIGS. 26 and 27, this example application concerning error correction in a quantum key distribution (QKD) system used for replenishing matched one-time pads (OTPs).

As is well known, two parties that posses the same secret random data can provably achieve both unbreakable secure communication using the Vernam cipher, and discrimination between legitimate messages and false or altered ones (using, for example, Wegman-Carter authentication). In both cases, however, data used from the secret random data shared by the parties must not be re-used. The term "one-time pad" is therefore frequently used to refer to the secret random data shared by the parties and this term, or its acronym "OTP", is used herein for secret random data shared by multiple parties; in the specific example given below, these parties are a party Alice associated with QKD transmitting apparatus and a party Bob associated with QKD receiving apparatus. Although for absolute security the one-time pad data must be truly random, references to one-time pads (OTP) herein includes secret data that may not be truly random but is sufficiently random as to provide an acceptable degree of security for the purposes concerned.

The fact that the OTP data is effectively consumed when used gives rise, in many applications of one-time pads, to the need to replenish the OTP data held by the multiple parties concerned in a highly secure manner so as not to prejudice the security bought by the employment of the OTP data.

Recently, quantum key distribution (QKD) methods and systems have been developed which enable two parties to share random data in a way that has a very high probability of detecting any eavesdroppers. This means that if no eavesdroppers are detected, the parties can have a high degree of confidence that the shared random data is secret; QKD methods and systems are therefore highly suitable for the secure replenishment of OTP data.

In known QKD systems, randomly polarized photons are sent from a transmitting apparatus to a receiving apparatus either through a fiber-optic cable or free space; typically such systems operate according to the well-known BB84 quantum coding scheme (see C. H. Bennett and G. Brassard "Quantum Cryptography: Public Key Distribution and Coin Tossing", Proceedings of IEEE International Conference on Computers Systems and Signal Processing, Bangalore India, December 1984, pp 175-179). As neither the detail of the BB84 scheme nor of a QKD transmitter or receiver are needed for an understanding of the present invention, much of such detail is not included herein but, if desired, can be readily obtained by reference to the above-mentioned documents or similar generally available works.

Figure 26:
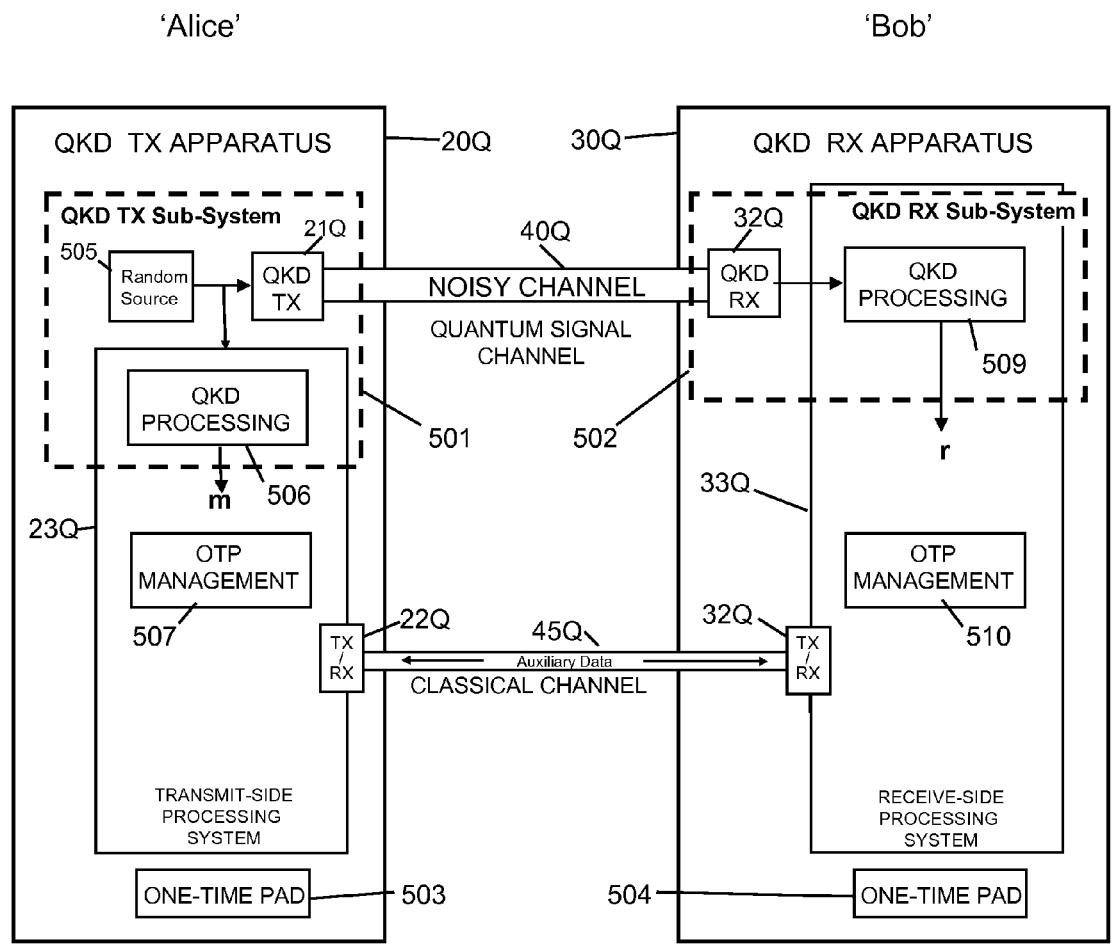
FIG. 26 is a schematic illustration of a quantum key distribution, QKD, system embodying the present invention.

FIG. 26 shows the QKD system of the example application, this system being depicted as a specialization of the FIG. 4 system with corresponding elements being indicated by the same references supplemented with the letter "Q"—thus the FIG. 26 QKD system comprises a QKD transmitting apparatus 20Q (associated with the party 'Alice') and a QKD receiving apparatus 30Q (associated with the party 'Bob') communicating via a quantum signal channel 40Q (the noisy channel) and a classical channel 45Q (a non-quantum signal channel such as a wireless channel that is either error free or error corrected). The QKD transmitting apparatus 20Q includes a transmit-side processing system 23Q and the QKD receiving apparatus 30Q includes a receive-side processing system 33Q. These processing systems 23Q & 33Q each comprise the same functional blocks (not shown in FIG. 26) as their FIG. 4 counterpart processing systems 23 & 33 respectively and further comprise additional functional blocks described below.

The QKD transmitting apparatus 20Q has a QKD transmitting sub-system 501 (shown in dashed outline in FIG. 26) that is arranged to cooperate with a QKD receiving sub-system 502 of the QKD receiving apparatus 30Q, via the quantum signal channel 40Q and the classical channel 45Q, to enable a random data set m to be passed from the transmitting apparatus 20Q to the receiving apparatus 30Q where it is output by the QKD receiving sub-system 502 as received data r yet to be error corrected.

The QKD transmitting sub-system 501 comprises a QKD transmitter 21Q (providing the optical components for selectively polarising photons), a source of random data 505, and a QKD processing block 506 conveniently provided as a functional block of the transmit-side processing system 23Q. The random data source 505 is arranged to generate pairs of random bits with randomness being achieved, for example, by a hardware random number generator such as a quantum-based arrangement in which a half-silvered mirror is used to pass/deflect photons to detectors to correspondingly generate a "0"/"1" with a 50:50 chance; an alternative form of random number generator can be constructed based around overdriving a resistor or diode to take advantage of the electron noise to trigger a random event. One bit of each pair of random bits determines the bit value to be sent by the transmitter 21Q in a current time slot and the other bit determines the polarization basis to be used for transmitting the bit value.

It is to be noted that the data set m to be shared by the QKD transmitter 21Q and QKD receiver 31Q, is a non-deterministic subset of the bit values transmitted by the transmitter 21Q, this subset comprising bit values for which both:

the QKD receiving sub-system 502 has received a signal over the quantum signal channel 40Q in the corresponding time slots, and the QKD transmitting sub-system 501 and the QKD receiving sub-system 502 have randomly used the same polarization bases (less any bit values passed over the classical channel, for example, in the course of determining the error rate of the channel 40Q). It is the responsibility of the QKD processing block 506 to determine the contents of the data set m based on the bit values transmitted by transmitter 21Q and information received over the classical channel 45Q about the signal reception by, and bases used by, the QKD receiving sub-system 502.

The QKD receiving sub-system 502 comprises a QKD receiver 32Q (providing the optical components for receiving photons and detecting their polarization), and a QKD processing block 509 conveniently provided as a functional block of the receive-side processing system 33Q. In the QKD receiving sub-system 502 the polarization basis used during successive time slots is randomly chosen by using a half-silvered mirror to randomly channel any incoming photon to detectors for one or other polarization base. It is the responsibility of the QKD processing block 509 to determine the received data r based on the received bit values and information received over the classical channel 45Q identifying the time slots for which the correct bases were used.

Correction of the received data r is then effected in the manner already described above with reference to FIGS. 4 to 25, to enable the QKD receiving apparatus 30Q to recover the random data set m.

The QKD transmitting apparatus 20Q holds a one-time pad 503 stored in memory and managed by an OTP management functional block 507 of the transmit-side processing system 23Q; similarly, the QKD receiving apparatus 30Q holds a one-time pad 504 stored in memory and managed by an OTP management functional block 510 of the receive-side processing system 33Q. The random data set m shared by the QKD transmitting apparatus 20Q with the QKD receiving apparatus 30Q is used to replenish the one-time pads 503 and 504 such that their contents continue to match each other.

Data taken from the one-time pads 503 and 504 can conveniently be used to mutually authenticate the QKD transmitting apparatus 20Q and QKD receiving apparatus 30Q, as well as to seed pseudo-random number generators used in the error correction process applied to the received data r. Indeed, data from the one-time pads could be used directly as the source of randomness required in the error correction process though this is somewhat inefficient.

Figure 27A:
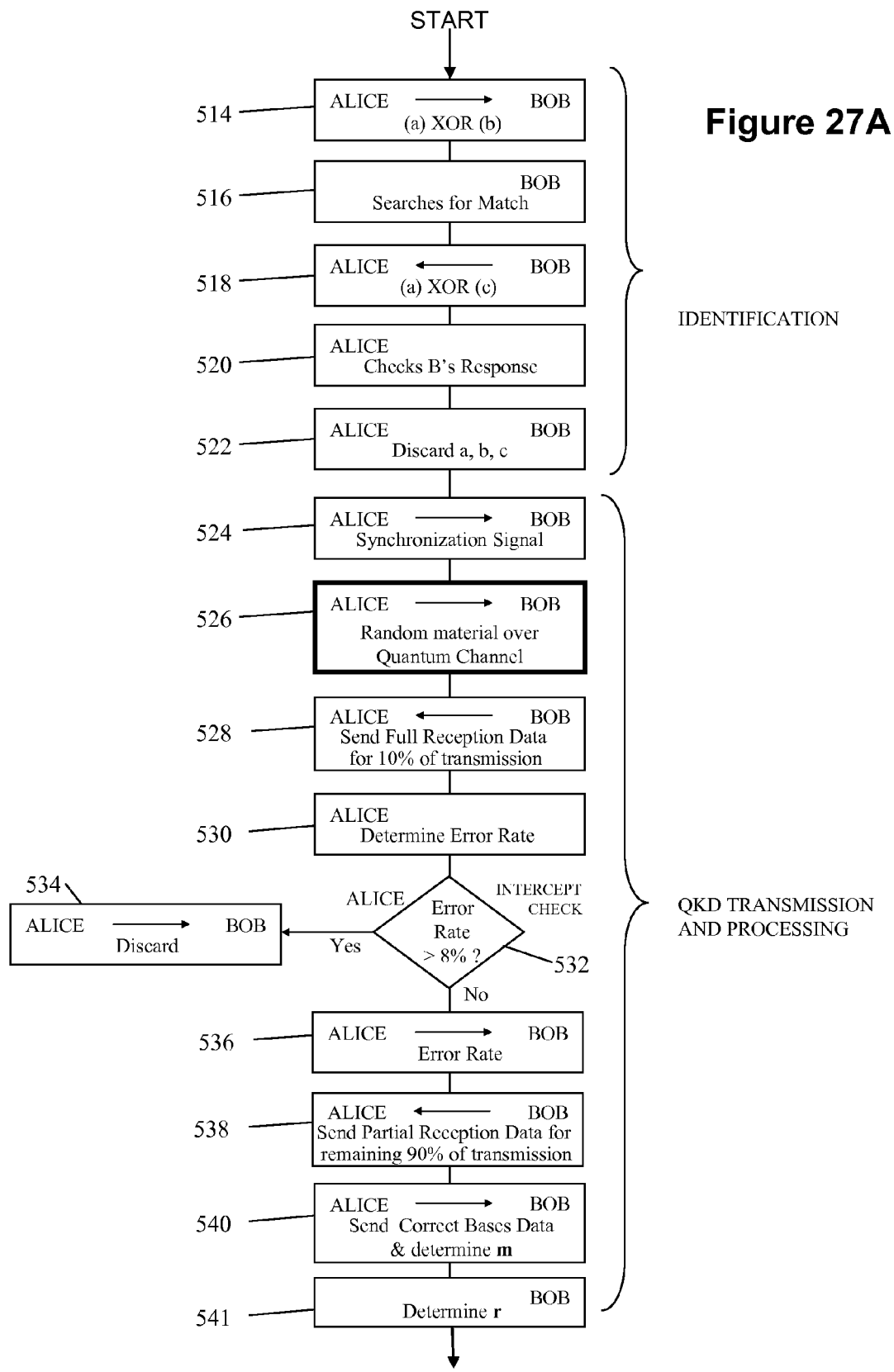
FIGS. 27A and 27B together form a functional flow diagram illustrating an example method of operation of the QKD system shown in FIG. 26.
Figure 27B:
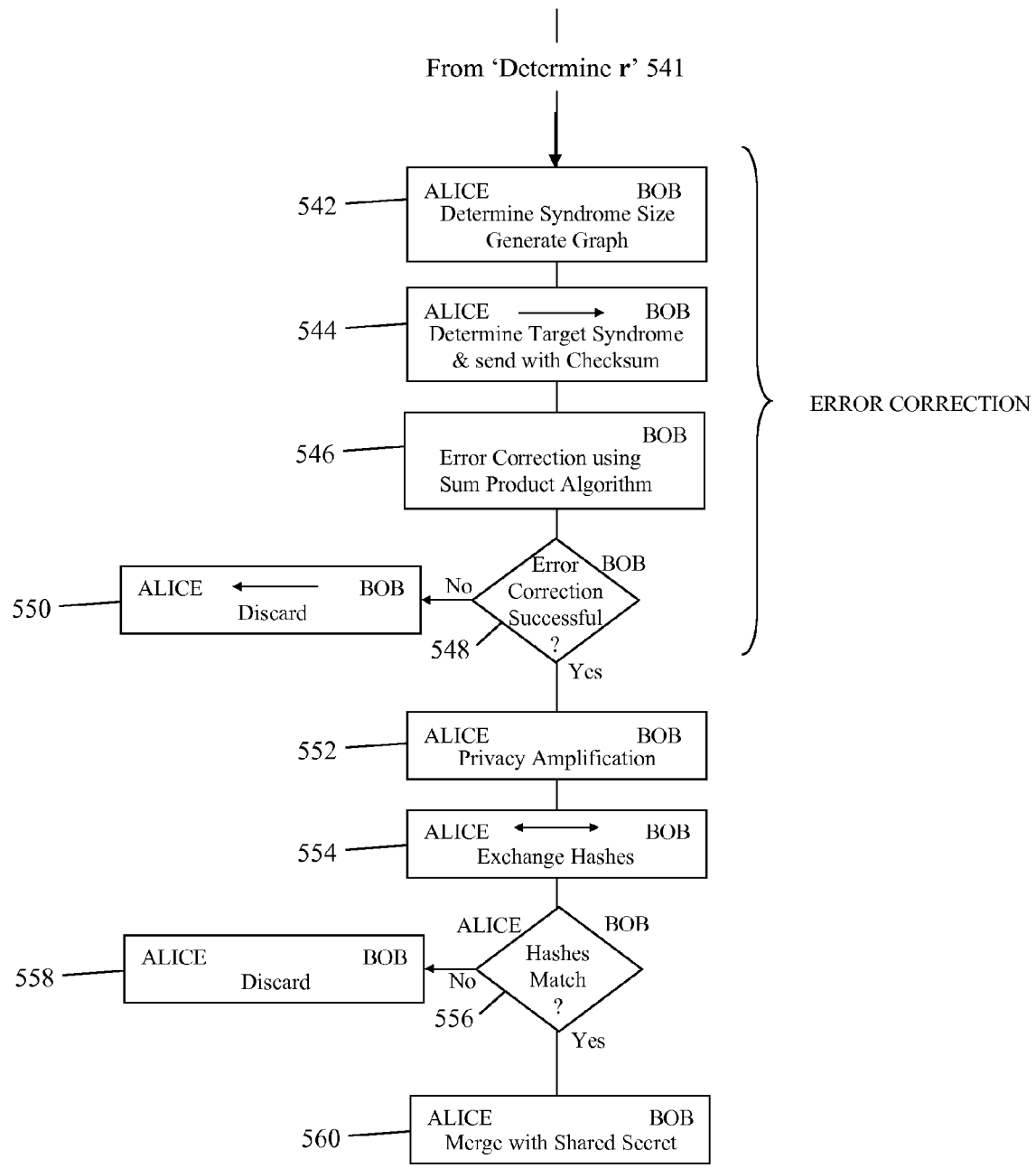

The overall flow of interaction and operation of the QKD transmitting apparatus 20Q and the QKD receiving apparatus 30Q to effect replenishment of their one-time pads 503, 504, will now be described with reference to FIGS. 27A and B. For convenience, this description is given in terms of steps carried out by Alice and Bob and it is to be understood that the steps concerned are actually effected by the QKD transmitting apparatus 20Q and the QKD receiving apparatus 30Q respectively, Furthermore, in FIGS. 27A and B, the appearance of the name of Alice and/or Bob in block capitals in relation to a particular step indicates the active involvement of the corresponding apparatus 20Q and/or 30Q, as the case may be, in that step.

In an initial identification phase (steps 514 to 522 in FIG. 26A), Alice initiates a dialog with Bob using the classical communication channel 45Q and Alice tells Bob who she is and Bob responds by telling Alice who he is.

According to the present example, this is done using data from the one-time pads 503, 504. For convenience of explanation, the one-time pads are considered as composed of:

$$a\|b\|c\|\text{rest\_of\_OTP}$$

where a, b and c are, for example, each 64 bits (the symbol $\|$ representing string concatenation). In step 514, Alice transmits (a) XOR (b) to Bob where XOR is the exclusive OR function. In step 516, Bob searches through his one-time pad 504 looking for a match. Once the match is found, in step 518 Bob transmits (a) XOR (c) back to Alice. In step 520, Alice checks that this is the correct response. Both Alice and Bob then, in step 522, delete a, b and c from their one-time pads 503, 504 leaving rest_of_OTP.

Next a QKD transmission and processing phase is carried out (steps 524 to 541), in this example using a variant of the BB84 quantum coding scheme as will now be described.

It is assumed that Alice and Bob have a predetermined agreement as to the length of a time slot in which a unit of data will be emitted. To achieve initial synchronisation, Alice in step 524 sends a pulse of photons over the quantum signal channel.

In step 526, Alice randomly generates (using source 505) a multiplicity of pairs of bits, typically of the order of $10^8$ pairs. As already indicated, each pair of bits consists of a data bit and a basis bit, the latter indicating the pair of polarization directions to be used for sending the data bit, be it vertical/horizontal or diagonal/anti-diagonal. A horizontally or diagonally polarised photon indicates a binary 1, while a vertically or anti-diagonally polarised photon indicates a binary 0. The data bit of each pair is thus sent by Alice over the quantum signal channel 40Q encoded according to the pair of polarization directions indicated by the basis bit of the same pair. When receiving the quantum signal from Alice, Bob randomly chooses which basis (pair of polarization directions) it will use to detect the quantum signal during each time slot and records the results. The sending of the data bits of the randomly-generated pairs of bits is the only communication that need occur using the quantum channel.

In step 528, Bob sends Alice, via the classical channel 45Q, complete reception data for a portion of the quantum signal transmission, the actual portion chosen being randomly selected and being of a size, for example, of 10% of the overall transmission; this enables Alice to determine the error rate of the quantum signal channel 40Q. The reception data comprises the time slots in which a signal was received, the data bit value determined as received for each of these time slots, and the basis (i.e. pair of polarization directions) thereof. In step 530, Alice uses the reception data from Bob concerning the randomly-selected 10% of the transmission to determine, for the time slots in which Bob received a signal and used the correct basis, the error rate of the channel 40Q.

In step 532, Alice makes a determination, based on the error rate derived in step 530, whether the quantum signal has been intercepted. The higher the error rate, the greater the probability is that the quantum signal has been intercepted and error rates above about 12% are generally unacceptable and, preferably, an upper threshold of 8% is set. If the error rate is found to be greater than the 8% threshold, the session is abandoned (step 534), Alice telling Bob over the classical channel 45Q to discard the received quantum signal data.

If the error rate is below the 8% threshold, Alice sends Bob the error rate over the classical channel 45Q, and both Alice and Bob subsequently use this error rate, in the manner already described above, to determine the syndrome size to be used in error correction Both Alice and Bob discard the data values used for determining the error rate.

In step 538, Bob sends Alice, via the classical channel 45Q, partial reception data for the remaining proportion (for example, the remaining 90%) of the quantum signal transmission, the partial reception data comprising the time slots in which a signal was received, and the basis (i.e. pair of polarization directions) thereof, but not the data bit values determined as received.

In step 540, Alice determines m as the data bit values transmitted for the time slots for which Bob received the quantum signal and used the correct basis for determining the received bit value. Alice also sends Bob, via the classical channel 45Q, information identifying the time slots holding the data bit values of m. In step 541, Bob determines the data bit values making up the received data r.

The next phase of operation (steps 542 to 550 in FIG. 27B) is error correction of the received data r in the manner already described above with reference to FIGS. 4 to 25. Thus, in step 542, Alice and Bob determine the size of the target syndrome to be used and then independently generate the same graph of a given or agreed sub-class of the Toroidal web class.

In step 544, Alice determines the target syndrome s from the data m using the graph generated in step 542; Alice also calculates a checksum for m. Alice sends the target syndrome s and the checksum to Bob over the classical channel 45Q.

In step 546, Bob uses the Sum-Product algorithm to seek to correct errors in the received data r. If error correction is unsuccessful (here the relevant tests of the end game routine 179 are depicted as carried out in step 154 and comprise the checks for consistency with the target syndrome s and the checksum formed over m), then in step 550 Bob tells Alice to discard the data m and Bob discards the received data r.

If error correction is successful so that Alice and Bob both end up with the new random data m shared over the quantum signal channel 40Q, then Alice and Bob both effect the same privacy amplification step 552. In this respect, it is to be noted that although the error-rate-based intercept check carried out in step 532 will detect interception of any substantial portion of the quantum signal transmission, an eavesdropper may still be able to successfully intercept a small number of bits of the quantum signal as there will be a finite (though very small) probability that more than one photon is sent during a time slot over the quantum channel thereby leaving open the possibility that an eavesdropper with a beam splitter can capture one photon while allowing Bob to receive the other photon. It is to compensate for such potential leakages of information to an eavesdropper that the privacy amplification step 552 is performed.

In the privacy amplification step 552 both Alice and Bob reduce the size of their respective versions of the new shared secret data m using a deterministic randomizing permutation, the reduction in size being dependent on the level of security required.

After privacy amplification, Alice and Bob are very likely to have the same result m'. However, in step 554 Alice and Bob seek to re-assure themselves that this is the case by exchanging a hash of their new shared secret data m'; to protect and authenticate the transmitted hash, it is XORed with bits popped from their respective one-time pads 503, 504. If the hashes differ (checked in step 556), the newly shared data m' is discarded (step 558).

If the exchanged hashes match, Alice and Bob are re-assured that they have the same new shared data m' and they each proceed to merge the new data m' with the existing contents of their respective one-time pads 503, 504. This merging involves the use of a hash function to ensure that an external observer has no knowledge of the final shared secret data in the one-time pads. In fact, provided there is a reasonable amount of data left in the one-time pads prior to merging, the merging operation introduces sufficient obscuration that, for most purposes, the privacy amplification step 552 and the following step 554 can be omitted.

Data from the replenished one-time pads can then be used, for example, to generate a session key (for example, a 128 bit session key) for encrypting an exchange of application data between the transmitting apparatus 20Q and receiving apparatus 30Q over the classical channel, the data used for creating the session key being discarded from the one-time pads.

It will be appreciated that the above-described QKD method is given as one example context of the present invention and the steps of this example given in FIG. 27 can be varied and/or carried out in a different sequence (within bounds that will be understood by persons skilled in the art).

With regard to the error correction methods described above with reference to FIGS. 4 to 25, many variants are, of course, possible. For example, although for reasons of minimizing processing, the size of the target syndrome is described as being dynamically determined in dependence on the error rate of the channel 40, it would alternatively be possible to operate with a predetermined syndrome size chosen to be able to handle all likely error rates; in this case, if all other graph parameters are also predetermined, graph creation can be carried out without the need to exchange any graph parameter data.

Whereas in the foregoing description, the error correction graphs have been dynamically and independently created by the transmitting apparatus 20 and receiving apparatus 30 for each subject data item m (or set of such items), it will be appreciated that graphs of the toroidal web class could also be used:

in systems which the error correction graph used is fixed and pre-installed in the transmitting apparatus and receiving apparatus;

in systems where only one of the transmitting apparatus and receiving apparatus generates the graph, the latter then being sent to the other apparatus; and in systems where the target syndrome is predetermined, for example, the null vector as would be the case where an error correction graph of the toroidal web class was used in a standard linear block code error correcting system.

The invention claimed is:

1. An apparatus comprising:
   a data communication device including an interface to a data channel; and
   a processing system connected to the data communication device and arranged to derive an ordered plurality of modulo-2 summations of respective selections of data bits of a binary data set associated with data flow through the data channel, said selections being in accordance with connections of variable nodes to sum nodes in a logical network of nodes and edges that together define at least a continuum of cells covering a finite toroid, each cell being delimited by an equal number of variable nodes and sum nodes alternately arranged and interconnected into a loop by edges, each variable node being associated with a respective binary-data-set bit position and each sum node corresponding to a respective said modulo-2 summation.

2. Apparatus according to claim 1, wherein the variable nodes of said continuum are randomly associated with the binary-data-set bit positions.

3. Apparatus according to claim 1, wherein each cell has six nodes each of which is shared with two adjacent cells and is linked by edges to three other nodes two of which are of the same cell, said continuum being representable as made up of hexagonal cells.

4. Apparatus according to claim 1, wherein each cell has twelve nodes with every third node being shared with three adjacent cells and being linked by edges to four other nodes two of which are of the same cell, the cell nodes between said every third node being linked only to nodes of the cell concerned, said continuum being representable as made up of cruciform cells.

5. Apparatus according to claim 1, wherein each cell has six nodes four of which are each shared with three adjacent cells and are each linked by edges to four other nodes two of which are of the same cell, the other two nodes of each cell being linked only to nodes of the cell concerned, said continuum being representable as made up of rectangular cells.

6. Apparatus according to claim 1, wherein the nodes and edges of said logical network further define a plurality of spider structures each comprising a node of one type, variable or sum, linked by edges to randomly-selected nodes of the other type, sum or variable, that also participate in defining said continuum of cells.

7. Apparatus according to claim 6, wherein each node of said one type is linked by edges to four randomly-selected nodes of the other type.

8. Apparatus according to claim 1, wherein the apparatus is arranged to receive a binary data set over the data channel and said processing system comprises an error-correction arrangement for correcting errors in the received binary data set, the error-correction arrangement being arranged to apply iterative belief propagation to adjust bit-value probabilities of the received binary data set such that said ordered plurality of modulo-2 summations, formed by said processing arrangement for said binary data set being the set of probable values of the received data set, matches a target syndrome.

9. Apparatus according to claim 1, wherein the apparatus is arranged to transmit the binary data set over the data channel, the apparatus being further arranged to output a target syndrome for use in error correcting the binary data set following its reception over the data channel, said processing arrangement being arranged to derive said target syndrome as said ordered plurality of modulo-2 summations.

10. An apparatus comprising:
a receiver including an interface to a data channel; and
an error-correction system coupled to receive a binary data string from the receiver and arranged to apply iterative belief propagation to adjust bit-value probabilities of the received binary data string such that an ordered plurality of modulo-2 summations of probable values of respective selections of received-data-string bits matches a target syndrome, said selections being in accordance with the connection of variable nodes to sum nodes in a network of nodes and edges that together define at least a continuum of cells covering a finite toroid, each cell being delimited by an equal number of variable and sum nodes alternately arranged and interconnected into a loop by edges, each variable node being associated with a respective received-data-string bit position and each sum node corresponding to a respective said modulo-2 summation.

11. An apparatus according to claim 10, wherein said network of nodes and edges further defines a plurality of spider structures each comprising a node of one type, variable or sum, linked by edges to randomly-selected nodes of the other type, sum or variable, that also participate in defining said continuum of cells.

12. An apparatus according to claim 10, wherein the variable nodes are randomly associated with the received-data-string bit positions.

* * * * *